United States Patent
Wang et al.

(10) Patent No.: US 9,944,121 B2
(45) Date of Patent: Apr. 17, 2018

(54) DUAL END REMOTE SWIVEL-LOCK FOR CASTER CARTS AND CARTS EQUIPPED WITH SAME

(71) Applicant: Darcor Limited, Toronto, Ontario (CA)

(72) Inventors: Kaiwen Wang, Toronto (CA);
Octavian Sioldea, Brampton (CA);
Adrian Steenson, Mississauga (CA)

(73) Assignee: Darcor Limited, Toronto, Ontario (CA)

( * ) Notice: Subject to any disclaimer, the term of this patent is extended or adjusted under 35 U.S.C. 154(b) by 0 days.

(21) Appl. No.: 15/194,819

(22) Filed: Jun. 28, 2016

(65) Prior Publication Data
US 2017/0057284 A1    Mar. 2, 2017

Related U.S. Application Data

(60) Provisional application No. 62/208,997, filed on Aug. 24, 2015.

(51) Int. Cl.
*B60B 33/02*   (2006.01)
*B62B 3/00*    (2006.01)
*B60B 33/00*   (2006.01)

(52) U.S. Cl.
CPC .......... *B60B 33/026* (2013.01); *B62B 3/001* (2013.01); *B62B 3/008* (2013.01); *B60B 33/0068* (2013.01); *B60B 2200/43* (2013.01)

(58) Field of Classification Search
CPC ..... B62B 3/001; B62B 3/008; B60B 33/0068; B60B 2200/43; B60B 33/026
See application file for complete search history.

(56) References Cited

U.S. PATENT DOCUMENTS

| | | | | |
|---|---|---|---|---|
| 2,154,525 A | * | 4/1939 | Noros | B60B 33/02 16/35 R |
| 4,248,444 A | * | 2/1981 | Johnson | A61G 1/0237 280/47.11 |
| 4,276,962 A | * | 7/1981 | Aulik | A61G 1/04 16/35 R |
| 4,309,791 A | * | 1/1982 | Aulik | A61G 1/04 16/35 R |
| 4,875,696 A | * | 10/1989 | Welch | B60B 33/02 188/1.12 |

(Continued)

*Primary Examiner* — Jacob B Meyer
(74) *Attorney, Agent, or Firm* — Patrick J Hofbauer

(57) ABSTRACT

A selectively operable steering locking mechanism includes front and back pivot locks, each respective one selectively movable between: a locked configuration whereat a respective front, or back, caster of the cart is precluded from pivoting about its vertical axis; and an unlocked configuration whereat the respective front, or back, caster is free to pivot its vertical axis. An interconnection mechanism interconnects the front and back pivot locks for synchronized movement between: a front-locked steering configuration whereat the front and back pivot locks are in the locked and unlocked configurations respectively; and a back-locked steering configuration whereat the front and back pivot locks are in the unlocked and locked configurations respectively. A control mechanism connects to the interconnection mechanism for its selected movement between the front-locked and back-locked steering configurations. A cart provided with the selectively operable steering locking mechanism is also disclosed.

28 Claims, 20 Drawing Sheets

(56) References Cited

U.S. PATENT DOCUMENTS

| | | | |
|---|---|---|---|
| 5,170,529 A * | 12/1992 | Kovacs | B60B 33/025 16/35 R |
| 5,377,342 A | 12/1994 | Sakai et al. | |
| 5,579,871 A * | 12/1996 | Emmrich | B60B 33/0042 16/35 R |
| 5,899,469 A * | 5/1999 | Pinto | B62B 3/001 16/35 R |
| 6,409,187 B1 * | 6/2002 | Crow, Jr. | B62B 5/04 188/20 |
| 6,425,591 B1 | 7/2002 | Ball | |
| 6,668,965 B2 | 12/2003 | Strong | |
| 7,200,894 B2 * | 4/2007 | Block | B60B 33/0039 16/18 R |
| 7,698,760 B2 | 4/2010 | Reckelhoff et al. | |
| 8,292,327 B2 | 10/2012 | Araya Moreno et al. | |
| 8,381,330 B2 | 2/2013 | Roussy et al. | |
| 8,484,802 B1 * | 7/2013 | Lin | B60B 33/0086 16/35 R |
| 8,511,693 B2 * | 8/2013 | Gass | B25H 1/04 280/43.14 |
| 8,516,656 B2 * | 8/2013 | Lin | B60B 33/0081 16/35 D |
| 8,910,953 B2 * | 12/2014 | Faulhaber | B62B 5/04 16/35 R |
| 9,061,547 B2 * | 6/2015 | Shih | B60B 33/021 |
| 9,126,455 B1 * | 9/2015 | Hsieh | B60B 33/0057 |
| 9,266,392 B2 * | 2/2016 | Brondum | B60B 33/021 |
| 9,579,241 B2 * | 2/2017 | Spoor | B62B 9/082 |
| 2004/0117943 A1 * | 6/2004 | Block | B60B 33/0039 16/18 R |
| 2011/0162141 A1 * | 7/2011 | Lemire | A61G 7/005 5/510 |
| 2013/0160237 A1 * | 6/2013 | Shih | B60B 33/025 16/47 |
| 2014/0102834 A1 * | 4/2014 | Spoor | B60T 11/046 188/1.12 |
| 2014/0265502 A1 * | 9/2014 | Hough | A61G 5/14 297/344.12 |
| 2014/0324315 A1 * | 10/2014 | Brondum | B60B 33/025 701/70 |
| 2015/0266342 A1 * | 9/2015 | Howard | A61G 1/0243 701/36 |

* cited by examiner

DUAL END REMOTE SWIVEL-LOCK FOR CASTER CARTS AND CARTS EQUIPPED WITH SAME

FIELD OF THE INVENTION

The present invention relates generally to the field of swivel locks for caster carts and, more particularly, for push carts meant to carry heavy loads.

BACKGROUND OF THE INVENTION

Push carts used to carry heavy loads, such as industrial and medical equipment, inside buildings having corridors and hallways, must be readily and accurately steerable to avoid damage to structures or injury to personnel located within such corridors and hallways. Such carts may be integrated into the lower housings or bases of such industrial and medical equipment, so as to form a unitary structure therewith.

Medical carts, hospital beds, and other medical equipment having casters may, in the prior art, have been provided with caster control mechanisms which afforded "neutral", "brake", and "steer" caster functions. In a neutral mode, some such mechanisms may have precluded rotational movement of a caster about its vertical axis, whereas in a steer mode, rotational movement of the caster about its vertical axis may have been permitted and, in a brake mode, rotational movement of the caster about its horizontal axis may have been precluded. Prior art control mechanisms of this type may have included two pedals connected to each other by a pivotable shaft as in U.S. Pat. No. 5,377,372 which issued to Rudolf et al. on Jan. 3, 1995 for a "Hospital Bed Castor Control Mechanism". The mechanism disclosed by Rudolf, however, provided links which moved (in unison) either towards, or away from, their respective ends. Accordingly, the Rudolf control mechanism either locked a caster at both ends of the bed from swivelling (in unison), or unlocked both of these casters (in unison), allowing them both to swivel. This and other prior art control mechanisms may have failed to afford any selection of caster swivelling as between the ends of the bed.

Various other control mechanisms may have been known in the prior art, including others which provided pedals with a main connecting rod between them that pivoted, or which provided a cable, an electronic controller and motor, or a solenoid for operational control of the mechanism. Other prior art may have provided for casters to be locked at one end, only, or for front and rear wheels to be interconnected only by a stabilizer bar.

What may be needed is a sturdy mechanical control device for selectively locking either (one or more) front casters, or (one or more) rear casters, while the opposite end casters remain free to rotate about a vertical axis, with such control device being readily operable by one or more users from either end, or both ends, of the cart.

There may be a need for such a control device which preferably provides the aforesaid functionality via a straightforward substantially rigid, longitudinally sliding rod member that interconnects foot-operable pedals at the front and back ends of the cart.

Additionally, or instead, a cart may be needed which has casters—preferably four casters—mounted on a main load carrying basal body with a foot-operable mechanism at both the front and rear ends of the cart, which permits selection, from either of the aforesaid ends, of one of the following alternatives: (a) all casters being swivelable; (b) the front casters being swivelable, and one or more back casters each being locked against rotation about a respective vertical axis; or (c) the back casters being swivelable, and one or more front casters each being locked against rotation about its respective vertical axis. There may be a need for a cart which can, without requiring an operator to switch ends, enable selective movement between (a) a front-locked steering configuration, (b) a neutral intermediate unlocked steering configuration, and (c) a back-locked steering configuration. A selective control mechanism may be needed which can help make a cart readily and accurately steerable, from either end, for use in carting heavy loads in narrow corridors and otherwise.

There may also be a need for such a control mechanism which may be readily adapted for use with a cart having only three casters or more than four casters.

It is an object of the present invention to solve, obviate or mitigate one or more problems, disadvantages and/or shortcomings associated with the prior art, to meet or provide for one or more needs and/or advantages, and/or to achieve one or more objects of the invention—one or more of which may preferably be readily appreciable by and/or suggested to those skilled in the art in view of the teachings and/or disclosures hereof.

SUMMARY OF THE INVENTION

In accordance with the present invention, there is disclosed a selectively operable steering locking mechanism for a cart which is adapted for front and back travel. The cart has a front portion and a back portion opposite the front portion. The selectively operable steering locking mechanism includes a front pivot locking mechanism, a back pivot locking mechanism, an interconnection mechanism, and a control mechanism.

The cart may be of the type which also has a front left caster and a front right caster each disposed adjacent the front portion of the cart, and a back left caster and a back right caster each disposed adjacent the back portion of the cart. Each of the front left caster, front right caster, back left caster, and back right caster is freely pivotable about a respective substantially vertical pivot axis. According to the invention, the front pivot locking mechanism is selectively movable between: a front pivot locked configuration whereat at least one of the front left and right casters is precluded from pivoting about its aforesaid respective substantially vertical pivot axis; and a front pivot unlocked configuration whereat the aforesaid at least one of the front left and right casters is free to pivot about its aforesaid respective substantially vertical pivot axis. According to the invention, the back pivot locking mechanism is selectively movable between: a back pivot locked configuration whereat at least one of the back left and right casters is precluded from pivoting about its aforesaid respective substantially vertical pivot axis; and a back pivot unlocked configuration whereat the aforesaid at least one of the back left and right casters is free to pivot about its aforesaid respective substantially vertical pivot axis.

The cart may be instead said to be of the type which has one or more front casters disposed adjacent the front portion of the cart, one or more back casters disposed adjacent the back portion of the cart, and one or more additional casters. Each of the front casters, back casters, and additional casters is freely pivotable about a respective substantially vertical pivot axis. According to the invention, the front pivot locking mechanism is selectively movable between: a front pivot locked configuration whereat at least one of the front casters is precluded from pivoting about its aforesaid respective substantially vertical pivot axis; and a front pivot unlocked configuration wheareat the aforesaid at least one of the front casters is free to pivot about its aforesaid respective substantially vertical pivot axis. According to the invention, the back pivot locking mechanism is selectively movable between: a back pivot locked configuration whereat at least one of the back casters is precluded from pivoting about its aforesaid respective substantially vertical pivot axis; and a back pivot unlocked configuration whereat the aforesaid at least one of the back casters is free to pivot about its aforesaid respective substantially vertical pivot axis.

According to the invention, the interconnection mechanism is for operatively interconnecting the front pivot locking mechanism and the back pivot locking mechanism for synchronized movement, one with the other, between (a) a front-locked steering configuration and (b) a back-locked steering configuration. In the front-locked steering configuration, the front pivot locking mechanism is in the front pivot locked configuration and the back pivot locking mechanism is in the back pivot unlocked configuration. In the back-locked steering configuration, the front pivot locking mechanism is in the front pivot unlocked configuration and the back pivot locking mechanism is in the back pivot locking configuration. The control mechanism is connected to the interconnection mechanism for selected movement of the interconnection mechanism between the front-locked steering configuration and the back-locked steering configuration.

According to an aspect of one embodiment of the invention, the interconnection mechanism may include a substantially rigid elongate rod member having a front rod portion disposed adjacent the front portion of the cart, and/or a back rod portion disposed adjacent the back portion of the cart.

According to an aspect of another embodiment of the invention, the control mechanism may include a front foot-operable pedal disposed adjacent the front portion of the cart, and/or a back foot-operable pedal disposed adjacent the back portion of the cart.

According to an aspect of another embodiment of the invention, the elongate rod member may define a longitudinal axis, and/or may be movable by the control mechanism in opposite directions parallel to the longitudinal axis between the front-locked steering configuration and the back-locked steering configuration.

According to an aspect of another embodiment of the invention, the front foot-operable pedal may be operatively connected to the front rod portion of the rod member, and/or the back foot-operable pedal may be operatively connected to the back rod portion of the rod member, to drive movement of the rod member in the opposite directions parallel to the longitudinal axis between the front-locked steering configuration and the back-locked steering configuration, preferably upon corresponding movement of the front and back foot-operable pedals.

According to an aspect of yet another embodiment of the invention, the interconnection mechanism may preferably, but need not necessarily, include one or more flexible cable members having a front cable portion disposed adjacent the front portion of the cart and a back cable portion disposed adjacent the back portion of the cart.

According to an aspect of yet another embodiment of the invention, the control mechanism may preferably, but need not necessarily, include a front foot-operable pedal disposed adjacent the front portion of the cart and/or a back foot-operable pedal disposed adjacent the back portion of the cart. The front cable portion and/or the back cable portion may preferably, but need not necessarily, be movable by the control mechanism, preferably in opposite directions, and/or preferably between the front-locked steering configuration and the back-locked steering configuration.

According to an aspect of yet another embodiment of the invention, the front foot-operable pedal may preferably be operatively connected to the front cable portion, and/or the back foot-operable pedal may preferably be operatively connected to the back cable portion, preferably to drive the aforesaid movement of the front cable portion and/or the back cable portion, preferably in the aforesaid opposite directions, preferably between the front-locked steering configuration and the back-locked steering configuration, and/or preferably upon corresponding movement of the front and back foot-operable pedals.

According to an aspect of a further embodiment of the invention, the interconnection mechanism may preferably, but need not necessarily, include a belt member having a front belt portion disposed about a front pulley member adjacent the front portion of the cart, and/or a back belt portion disposed about a back pulley member adjacent the back portion of said cart.

According to an aspect of a further embodiment of the invention, the control mechanism may preferably, but need not necessarily, include a front foot-operable pedal disposed adjacent the front portion of the cart, and/or a back foot-operable pedal disposed adjacent the back portion of the cart. The front pulley member and/or the back pulley member may preferably, but need not necessarily, be rotatable with and/or by the belt member, preferably in opposite directions, and/or preferably between the front-locked steering configuration and the back-locked steering configuration.

According to an aspect of a further embodiment of the invention, the front foot-operable pedal may preferably be operatively connected to said front pulley member, and/or the back foot-operable pedal may preferably be operatively connected to the back pulley member, preferably to drive the aforesaid rotation of the front pulley member and/or the back pulley member with and/or by the belt member, preferably in the aforesaid opposite directions, preferably between the front-locked steering configuration and the back-locked steering configuration, and/or preferably upon corresponding movement of the front and back foot-operable pedals.

According to an aspect of another embodiment of the invention, the selectively operable steering locking mechanism may also include a steering configuration retention mechanism for releasably holding the interconnecting mechanism in the front-locked steering configuration, and/or for releasably holding the interconnecting mechanism in the back-locked steering configuration.

According to an aspect of another embodiment of the invention, the interconnection mechanism may preferably, but need not necessarily, include a substantially rigid elongate rod member having a front rod portion disposed adjacent the front portion of the cart and/or a back rod portion disposed adjacent the back portion of the cart. According to this aspect of this embodiment of the invention, the steering configuration retention mechanism may include one or more front-locked detents located on the rod member to correspond with the front-locked steering configuration, and/or one or more back-locked detents located on the rod member to correspond with the back-locked steering configuration. The steering configuration retention mechanism may also include one or more detent engagement mechanisms mounted on the cart for spring-biased releasable radial engagement with the aforesaid one or more front-locked detents when the rod member is in the front-locked steering configuration and/or for spring-biased releasable radial engagement with the aforesaid one or more back-locked detents when the rod member is in the back-locked steering configuration.

According to an aspect of yet another embodiment of the invention, the interconnection mechanism may preferably, but need not necessarily, include one or more flexible cable members having a front cable portion disposed adjacent the front portion of the cart and/or a back cable portion disposed adjacent the back portion of the cart. The control mechanism may preferably, but need not necessarily, include a front foot-operable pedal disposed adjacent the front portion of the cart and/or a back foot-operable pedal disposed adjacent the back portion of the cart. The front cable portion and/or the back cable portion may preferably, but need not necessarily, be movable by the control mechanism, preferably in opposite directions, and/or preferably between the front-locked steering configuration and the back-locked steering configuration. According to this aspect of this embodiment of the invention, the steering configuration retention mechanism may preferably, but need not necessarily, include one or more front-locked notches located on the cart, preferably to correspond with the front-locked steering configuration, and/or one or more back-locked notches located on the cart, preferably to correspond with the back-locked steering configuration. One or more notch engagement mechanisms may preferably, but need not necessarily, be mounted on the front foot-operable pedal and/or the back foot-operable pedal for spring-biased releasable engagement with the front-locked notches, preferably when the front cable portion is in the front-locked steering configuration, and/or for spring-biased releasable engagement with the back-locked notches, preferably when the back cable portion is in the back-locked steering configuration.

According to an aspect of a further embodiment of the invention, said interconnection mechanism may preferably, but need not necessarily, include a substantially rigid front rod member disposed adjacent the front portion of the cart and/or a substantially rigid back rod member disposed adjacent the back portion of the cart. The steering configuration retention mechanism may preferably, but need not necessarily, include one or more front-locked detents located on the front rod member, preferably to correspond with the front-locked steering configuration, and/or one or more back-locked detents located on the back rod member, preferably to correspond with the back-locked steering configuration. Two or more detent engagement mechanisms may preferably, but need not necessarily, be mounted on the cart for spring-biased releasable radial engagement with the front-locked detents, preferably when the front rod member is in the front-locked steering configuration, and/or for spring-biased releasable radial engagement with the back-locked detents, preferably when the back rod member is in the back-locked steering configuration.

According to an aspect of another embodiment of the invention, an intermediate unlocked steering configuration may reside between the front-locked steering configuration and the back-locked steering configuration. In the intermediate unlocked steering configuration, the front pivot locking mechanism may be in the front pivot unlocked configuration and the back pivot locking mechanism may be in the back pivot unlocked configuration. The control mechanism also may selectively move the interconnection mechanism between the front-locked steering configuration, the intermediate unlocked steering configuration, and the back-locked steering configuration. The steering configuration retention mechanism also may releasably hold the interconnecting mechanism in the intermediate unlocked steering configuration.

According to an aspect of another embodiment of the invention, the interconnection mechanism may preferably, but need not necessarily, include a substantially rigid elongate rod member having a front rod portion disposed adjacent the front portion of the cart and/or a back rod portion disposed adjacent the back portion of the cart. According to this aspect of this embodiment of the invention, the steering configuration retention mechanism may also include one or more intermediate detents located on the rod member to correspond with the intermediate unlocked steering configuration. The steering configuration retention mechanism may additionally include one or more detent engagement mechanisms mounted on the cart for spring-biased releasable radial engagement with the aforesaid one or more intermediate detents when the rod member is in the intermediate unlocked steering configuration.

According to the invention, there is also disclosed a selectively operable steering locking cart adapted for front and back travel. The cart includes a front portion and a back portion opposite the front portion, a front left caster and a front right caster each disposed adjacent the front portion, and a back left caster and a back right caster each disposed adjacent the back portion. Each of the front left caster, front right caster, back left caster, and back right caster is freely pivotable about a respective substantially vertical pivot axis. According to the invention, the cart also includes a front pivot locking mechanism, a back pivot locking mechanism, an interconnection mechanism, and a control mechanism. The front pivot locking mechanism is selectively movable between: a front pivot locked configuration whereat at least one of the front left and right casters is precluded from pivoting about its aforesaid respective substantially vertical pivot axis; and a front pivot unlocked configuration whereat the aforesaid at least one of the front left and right casters is free to pivot about its aforesaid respective substantially vertical pivot axis. The back pivot locking mechanism is selectively movable between: a back pivot locked configuration whereat at least one of the back left and right casters is precluded from pivoting about its aforesaid respective substantially vertical pivot axis; and a back pivot unlocked configuration whereat the aforesaid at least one of the back left and right casters is free to pivot about its aforesaid respective substantially vertical pivot axis. The interconnection mechanism is for operatively interconnecting the front pivot locking mechanism and the back pivot locking mechanism for synchronized movement, one with the other, between (a) a front-locked steering configuration and (b) a back-locked steering configuration. In the front-locked steering configuration, the front pivot locking mechanism is in the front pivot locked configuration and the back pivot locking mechanism is in the back pivot unlocked configuration. In the back-locked steering configuration, the front pivot locking mechanism is in the front pivot unlocked configuration and the back pivot locking mechanism is in the back pivot locking configuration. The control mechanism is connected to the interconnection mechanism for selected movement of the interconnection mechanism between the front-locked steering configuration and the back-locked steering configuration.

According to an aspect of another embodiment of the invention, each of the front left caster, front right caster, back left caster, and back right caster may be freely rollable about a respective substantially horizontal rolling axis. The cart may include a roll locking mechanism mounted on one or more of the front left caster, front right caster, back left caster, and back right caster. The roll locking mechanism may be selectively movable between a roll locked configuration and a roll unlocked configuration. In the roll locked configuration, each of the aforesaid one or more of the front left caster, front right caster, back left caster, and back right caster may be precluded from rolling about its aforesaid respective substantially horizontal rolling axis. In the roll unlocked configuration, each of the aforesaid one or more of the front left caster, front right caster, back left caster, and back right caster may be free to roll about its aforesaid respective substantially horizontal rolling axis.

According to the invention, there is also disclosed a selectively operable steering locking cart adapted for front and back travel. The cart includes a front portion and a back portion opposite the front portion, one or more front casters disposed adjacent the front portion, one or more back casters disposed adjacent the back portion, and one or more additional casters. Each of the front casters, back casters, and additional casters is freely pivotable about a respective substantially vertical pivot axis. According to the invention, the cart also includes a front pivot locking mechanism, a back pivot locking mechanism, an interconnection mechanism, and a control mechanism. The front pivot locking mechanism is selectively movable between: a front pivot locked configuration whereat at least one of the front casters is precluded from pivoting about its aforesaid respective substantially vertical pivot axis; and a front pivot unlocked configuration whereat the aforesaid at least one of the front casters is free to pivot about its aforesaid respective substantially vertical pivot axis. The back pivot locking mechanism is selectively movable between: a back pivot locked configuration whereat at least one of the back casters is precluded from pivoting about its aforesaid respective substantially vertical pivot axis; and a back pivot unlocked configuration whereat the aforesaid at least one of the back casters is free to pivot about its aforesaid respective substantially vertical pivot axis. The interconnection mechanism is for operatively interconnecting the front pivot locking mechanism and the back pivot locking mechanism for synchronized movement, one with the other, between (a) a front-locked steering configuration and (b) a back-locked steering configuration. In the front-locked steering configuration, the front pivot locking mechanism is in the front pivot locked configuration and the back pivot locking mechanism is in the back pivot unlocked configuration. In the back-locked steering configuration, the front pivot locking mechanism is in the front pivot unlocked configuration and the back pivot locking mechanism is in the back pivot locking configuration. The control mechanism is connected to the interconnection mechanism for selected movement of the interconnection mechanism between the front-locked steering configuration and the back-locked steering configuration.

According to an aspect of another embodiment of the invention, at least one of the additional casters is disposed adjacent the front portion or the back portion.

The advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

BRIEF DESCRIPTION OF THE DRAWINGS

The novel and inventive features which are believed to be characteristic of the dual end remote swivel-lock for caster carts and carts equipped with same according to the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only, and are not intended as a definition of the limits of the invention. In the accompanying drawings.

DETAILED DESCRIPTION OF ILLUSTRATED EMBODIMENTS

Figure 2A:
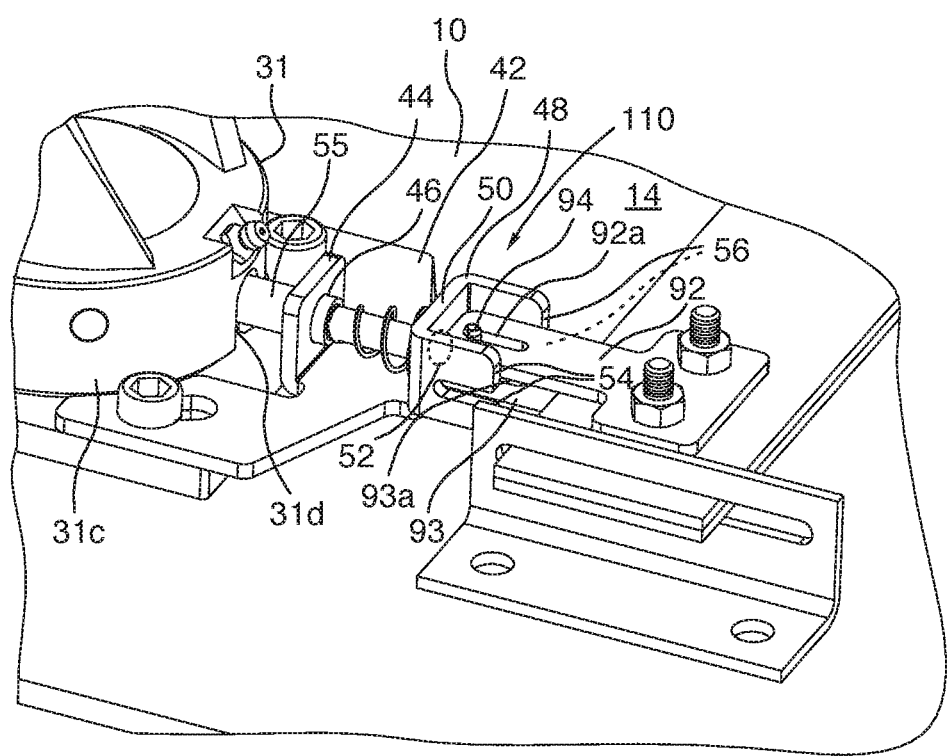
FIG. 2A is an enlarged bottom rear right perspective view of the front pivot locking mechanism of the dual end remote swivel-lock for caster carts of FIG. 1, shown with the front pivot locking mechanism in a pivot locked configuration.
Figure 2B:
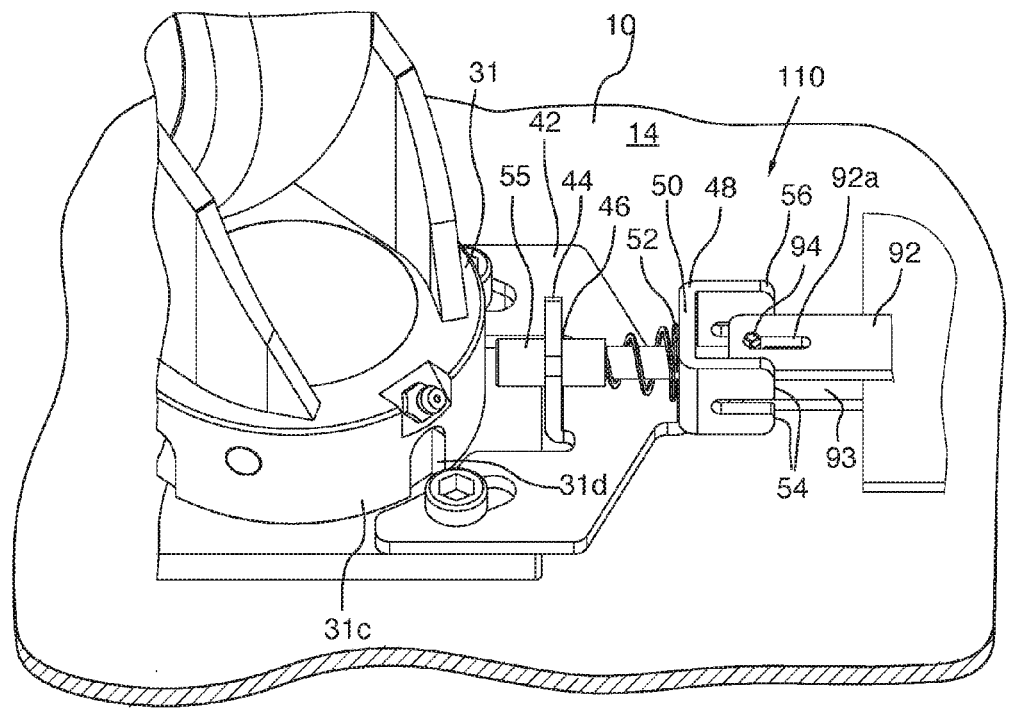
FIG. 2B is an enlarged bottom right perspective view of the front pivot locking mechanism of the dual end remote swivel-lock for caster carts of FIG. 1, shown with the front pivot locking mechanism part way between a pivot locked configuration and a pivot unlocked configuration.
Figure 2C:
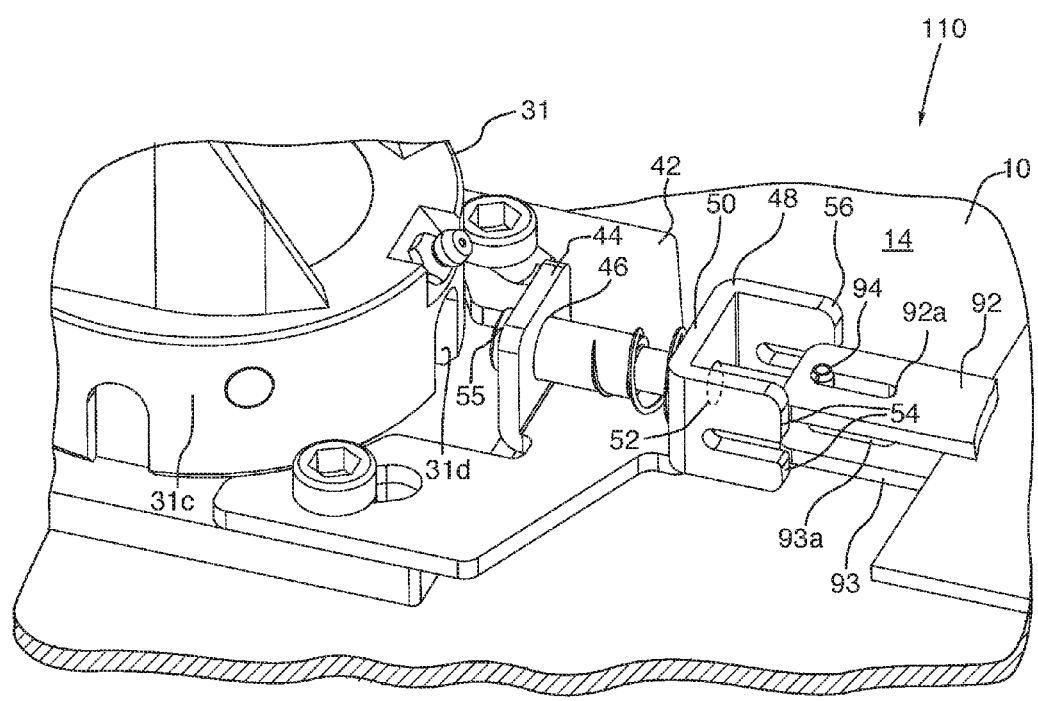
FIG. 2C is an enlarged bottom rear right perspective view of the front pivot locking mechanism of the dual end remote swivel-lock for caster carts of FIG. 1, with the front pivot locking mechanism in a pivot unlocked configuration.
Figure 3:
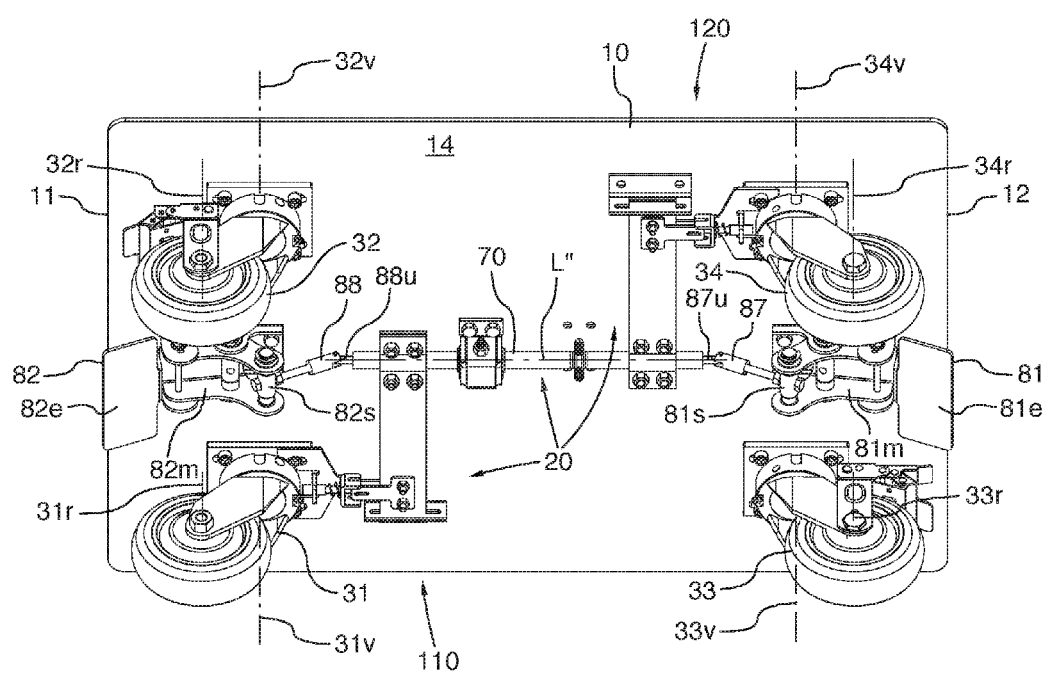
FIG. 3 is a bottom left perspective view of the dual end remote swivel-lock for caster carts of FIG. 1, shown with a mounting bracket removed for ease of illustrating a configuration latching mechanism thereof, and with the steering locking mechanism in a neutral intermediate unlocked configuration such that the four casters are pivotable about their respective vertical axes.

Referring now to FIGS. 1 through 6C of the drawings, it can readily be seen that the illustrated embodiment of the present invention generally comprises a heavy-duty selectively operable steering locking mechanism, as indicated by general reference numeral 20, for a cart 10 having preferably four (4) casters 31,32,33,34 mounted on the bottom surface 14 of the cart 10. More specifically, the cart 10 has a front end 11 and a back end 12, a front right caster 31 (as viewed from the top of the cart 10) and a front left caster 32 (as viewed from the top of the cart 10) each disposed adjacent the front end 11 of the cart 10, a back right caster 33 (as viewed from the top of the cart 10) and a back left caster 34 (as viewed from the top of the cart 10) each disposed adjacent the back end 12 of the cart 10. Each of the front right caster 31, the front left caster 32, the back right caster 33, and the back left caster 34 is freely pivotable about a respective substantially vertical pivot axis 31$v$,32$v$,33$v$,34$v$ (as best seen in FIG. 3). In other words, the wheels 31$a$, 32$a$,33$a$,34$a$ of each of the respective casters 31,32,33,34 can freely pivot about a respective vertical axis 31$v$,32$v$,33$v$, 34$v$ as the cart 10 is pushed along a direction of travel, as indicated by arrows "T1" and "T2", in a straight line path and/or in a curved path, such as around corners. It should be understood, that the cart 10 can be pushed (or pulled, if desired) in either one of two general directions, either in a first direction of travel as indicated by arrow "T1", with the front end 11 leading and the back end 12 trailing, or in a second direction of travel as indicated by arrow "T2", with the back end 12 leading and the front end 11 trailing. Due to the fact that the cart 10 can be moved along in either direction, and may need to travel in a straight path or a curved path at any time, it useful to be able to selectively control the steering action of the cart 10. When the cart is to travel generally straight, the four casters 31,32,33,34 are free to pivot about their respective vertical axes 31$v$,32$v$,33$v$,34$v$.

In order for an operator (not specifically shown) to more readily and easily steer the cart 10 along a curved path with the operator at the back end 12 of the cart 10, it is desirable to lock the front right caster 31, such that rotation of the front right caster 31 about the vertical axis 31$v$ is precluded.

Further, in order for an operator (not specifically shown) to more readily and easily steer the cart 10 along a curved path with the operator at the front end 11 of the cart 10, it is desirable to lock the back left caster 34 such that rotation of the back left caster 34 about the vertical axis 34$v$ is precluded.

Such control of the steering of the cart 10 from either the front end 11 or the back end 12 of cart 10 is a primary object of the present invention, and is particularly important where the load carried by the cart 10 is heavy or large, which latter two attributes make steering from the trailing end of the cart more difficult, especially where a single operator is required to both push and steer the cart 10.

Further, the front right caster 31 comprises a wheel 31$a$ operatively retained for free rotation about a horizontal axis of rotation 31$r$ by a wheel bracket 31$b$ connected to a circular base 31$c$. The circular base 31$c$ is pivotally mounted via a bearing assembly (not shown) on a square base 31$e$ that is secured to the bottom surface 14 of the cart 10 and has two vertical slots 31$d$ spaced apart at one-hundred-eighty degree (180°) intervals around the perimeter of the circular base 31$c$.

The front left caster 32 comprises a wheel 32$a$ operatively retained for free rotation about a horizontal axis of rotation 32$r$ (see FIG. 3) by a wheel bracket 32$b$ connected to a circular base 32$c$. The circular base 32$c$ is pivotally mounted via a conventional bearing assembly (not shown) on a square base 32$e$ that is secured to the bottom surface 14 of the cart 10 and optionally has two vertical slots 32$d$ spaced apart at one-hundred-eighty degree (180°) intervals around the perimeter of the circular base 32$d$.

The back right caster 33 comprises a wheel 33$a$ operatively retained for free rotation about a horizontal axis of rotation 33$r$ (see FIG. 3) by a wheel bracket 33$b$ connected to a circular base 33$c$. The circular base 33$c$ is pivotally mounted via a conventional bearing assembly (not shown) on a square base 33$e$ that is secured to the bottom surface 14 of the cart 10 and optionally has two vertical slots 33$d$ spaced apart at one-hundred-eighty degree (180°) intervals around the perimeter of the circular base 33$d$.

The back left caster 34 comprises a wheel 34$a$ operatively retained for free rotation about a horizontal axis of rotation 34$r$ (see FIG. 3) by a wheel bracket 34$b$ connected to a circular base 34$c$. The circular base 34$c$ is pivotally mounted via a conventional bearing assembly (not shown) on a square base 34$e$ that is secured to the bottom surface 14 of the cart 10 and has two vertical slots 34$d$ spaced apart at one-hundred-eighty degree (180°) intervals around the perimeter of the circular base 34$c$.

In other words, the wheels 31$a$,32$a$,33$a$,34$a$ of each of the respective casters 31,32,33,34 can each freely roll about a respective horizontal axis 31$r$,32$r$,33$r$,34$r$ as the cart 10 is pushed along a direction of travel, as indicated by arrows "T1" and "T2".

As can be seen from FIGS. 1, 3, 4 and 5, one of the casters adjacent the front end 11 of the cart 10, namely the front right caster 31, and one of the casters adjacent the back end 12 of the cart 10, namely the back left caster 34, are operatively engageable by a selectively operable steering locking mechanism 20 according to the present invention, as will be discussed in greater detail subsequently. Alternatively, it is contemplated that all four casters 31,32,33,34 could be operatively engageable by the selectively operable steering locking mechanism 20 by non-inventive multiplication of certain ones of the structures and assemblies described herein, as will be readily apparent to an average worker in the field.

Further, the other of the casters adjacent the front end 11 of the cart 10, namely the front left caster 32, and one of the casters adjacent the back end 12 of the cart 10, namely the back right caster 33, each have a separate and independent conventional braking apparatus mounted thereon, as indicated by the general reference numerals 90,91. Each braking apparatus 90,91 is manually foot operable to preclude rotation of the wheels 32a,33a about their respective horizontal axis 32r,33r, and may not be germane to the present invention. Accordingly, the brake apparatus 90,91 will not be discussed subsequently.

Figure 1:
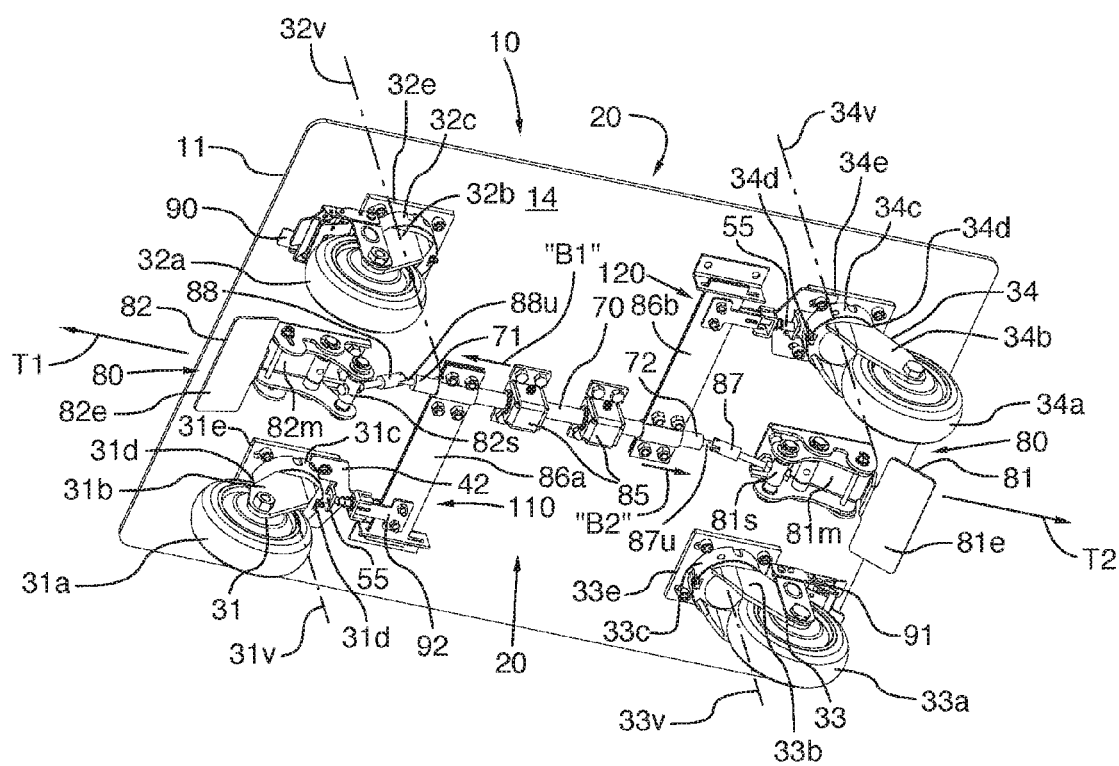
FIG. 1 is a bottom front left perspective view of a dual end remote swivel-lock for caster carts according to the present invention, shown with a steering locking mechanism thereof in a neutral intermediate unlocked configuration with all casters pivotable, and none of the casters locked from pivotal rotation.

The selectively operable steering locking mechanism 20 comprises a front pivot locking mechanism, as indicated in FIG. 1 by the general reference numeral 110, and a back pivot locking mechanism, as indicated by the general reference numeral 120. The front pivot locking mechanism 110 and the back pivot locking mechanism 120 are substantially identical one to the other in terms of structure and function, and accordingly, enlarged views (FIGS. 2A, 2B and 2C) of only the front pivot locking mechanism 100 have been provided.

Figure 4:
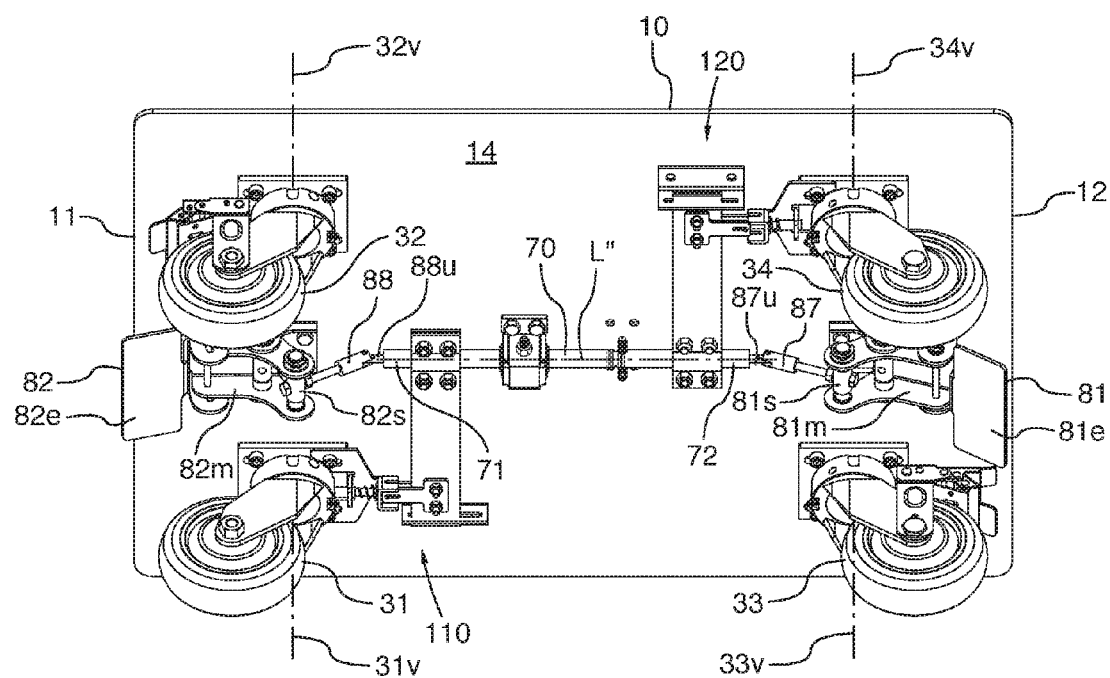
FIG. 4 is a bottom left perspective view of the dual end remote swivel-lock for caster carts of FIG. 1, shown with a mounting bracket removed for ease of illustrating the configuration latching mechanism, and with the steering locking mechanism in a front-locked steering configuration such that the front right caster is locked from pivotal rotation about its vertical axis and the other three casters are pivotable about their respective vertical axes.
Figure 5:
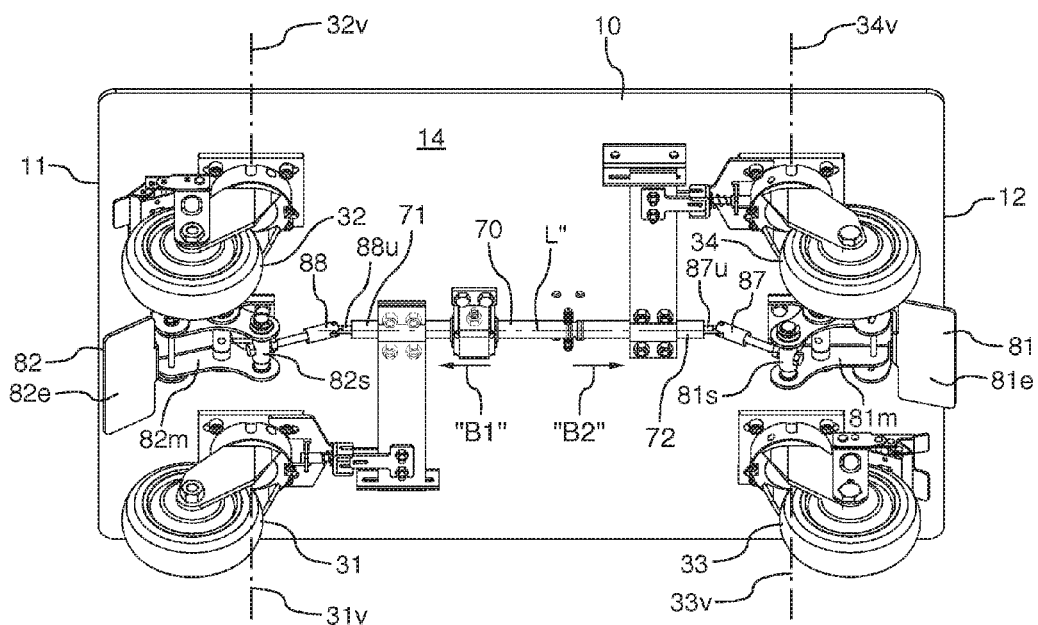
FIG. 5 is a bottom left perspective view of the dual end remote swivel-lock for caster carts of FIG. 1, shown with a mounting bracket removed for ease of illustrating the configuration latching mechanism, and with the steering locking mechanism in a back-locked steering configuration such that the back left caster is locked from pivotal rotation about its vertical axis and the other three casters are pivotable about their respective vertical axes.

The front pivot locking mechanism 110 is selectively movable between a pivot locked configuration, as can be seen in FIGS. 2A and 4, and a pivot unlocked configuration, as can be seen in FIGS. 1, 2B, 3 and 5. Similarly, the back pivot locking mechanism 120 is selectively movable between a pivot locked configuration, as can be seen in FIG. 5, and a pivot unlocked configuration, as can be seen in FIGS. 1, 3 and 4. The pivot locked configuration and the pivot unlocked configuration for the back pivot locking mechanism 120 are the same as for the front pivot locking mechanism 110, although it will be appreciated from a full reading of this specification that they operate out of phase one with the other.

In the pivot locked configuration of the front pivot locking mechanism 110, at least one of the front right caster 31 and the front left caster 32 is precluded from pivoting about its respective substantially vertical pivot axis 31v,32v by the front pivot locking mechanism 110. More specifically, in the illustrated embodiment, the front right caster 31 is precluded from pivoting about its substantially vertical pivot axis 31v by the front pivot locking mechanism 110. As can be best seen in FIG. 2A, this locking is caused by a plunger member 55 of the front pivot locking mechanism 110 being moved into engagement with the co-operating vertical slot 31d in the base 31c of the front right caster 31, thus precluding the front right caster 31 from pivoting about its respective substantially vertical pivot axis 31v. The plunger member 55 remains biased in place by the spring 43, until removed from the vertical slot 31a, as described below.

Similarly, in the pivot locked configuration of the back pivot locking mechanism 120, at least one of the back right caster 33 and the back left caster 34, is precluded from pivoting about its respective substantially vertical pivot axis 33v,34v by the back pivot locking mechanism 120. More specifically, in the illustrated embodiment, the back left caster 34 is precluded from pivoting about its substantially vertical pivot axis 34v by the back pivot locking mechanism 120. This locking is caused by the plunger member 55 of the back pivot locking mechanism 120 being moved into engagement with the co-operating vertical slot 34d in the base 34c of the back left caster 34, thus precluding the back left caster 34 from pivoting about its respective substantially vertical pivot axis 34v.

In the pivot unlocked configuration, at least one of the front right caster 31 and the front left caster 32 is free to pivot about its respective substantially vertical pivot axis 31v, 32v. More specifically, in the illustrated embodiment, the front right caster 31 is free to pivot about its substantially vertical pivot axis 31v by the front pivot locking mechanism 110. As can be best seen in FIG. 2B, this unlocking is caused by the plunger member 55 of the front pivot locking mechanism 110 being removed from engagement with the co-operating vertical slot 31d in the base 31c of the front right caster 31, thus allowing the front right caster 31 to pivot about its respective substantially vertical pivot axis 31v.

Similarly, in the pivot locked configuration of the back pivot locking mechanism 120, the back left caster 34 is free to pivot about its substantially vertical pivot axis 34v by the back pivot locking mechanism 120. This unlocking is caused by the plunger member 55 of the back pivot locking mechanism 120 being removed from engagement with the co-operating vertical slot 34d in the base 34c of the back left caster 34, thus allowing the back left caster 34 to pivot about its respective substantially vertical pivot axis 34v.

A flat horizontal plate 42 is secured to the bottom surface 14 of the cart 10 in the region of the front right caster 31, and extends longitudinally inwardly from the base 31c of the front right caster 31 towards the center of the cart 10. The flat horizontal plate 42 has a forward, vertically directed tongue 44 adjacent the front right caster 31, with a central aperture 46 punched or otherwise formed therein. The flat horizontal plate 42 terminates rearwardly in a bracket 48 having a rearward vertically directed tongue portion 50 that is parallel to the forward vertically directed tongue 44 and has an aperture 52, and a left pair 54 and a right pair 56 of tines extending rearwardly in substantially transverse orientation from the rearward vertically directed tongue portion 50.

The plunger member 55 is slidably mounted in the aperture 46 of the vertically directed tongue 44, and the aperture 52 of the forward vertically directed tongue portion 50, and engages either one of the two co-operating vertical slots 31d in the base 31c of the caster, to thereby preclude the swivel motion of the front right caster 31 about the vertical axis 31v, as previously described. The engaged position of the plunger 55 (best seen in FIG. 2A) corresponds to the pivot locked configuration of the front pivot locking mechanism 110. The plunger member 55 is pulled away from caster 31 by parallel tongue members 92 and 93, having a vertically oriented drive pin 94 connecting the parallel tongue members 92 and 93 with the plunger member 55 by means of sliding engagement of the drive pin 94 within slots 92a, 93a respectively formed therein. The relative positions of the plunger 55, drive pin 94 and parallel tongue members 92 and 93 shown in FIG. 2c correspond to the pivot unlocked configuration of the front pivot locking mechanism 110.

The above description of the pivot locked configuration and the pivot unlocked configuration of the first pivot locking mechanism 110 and the front right caster 31 also applies equally to the pivot locked configuration and the pivot unlocked configuration of the back pivot locking mechanism 120 and the back left caster 34 and, accordingly, will not be separately described in detail.

Figure 4A:
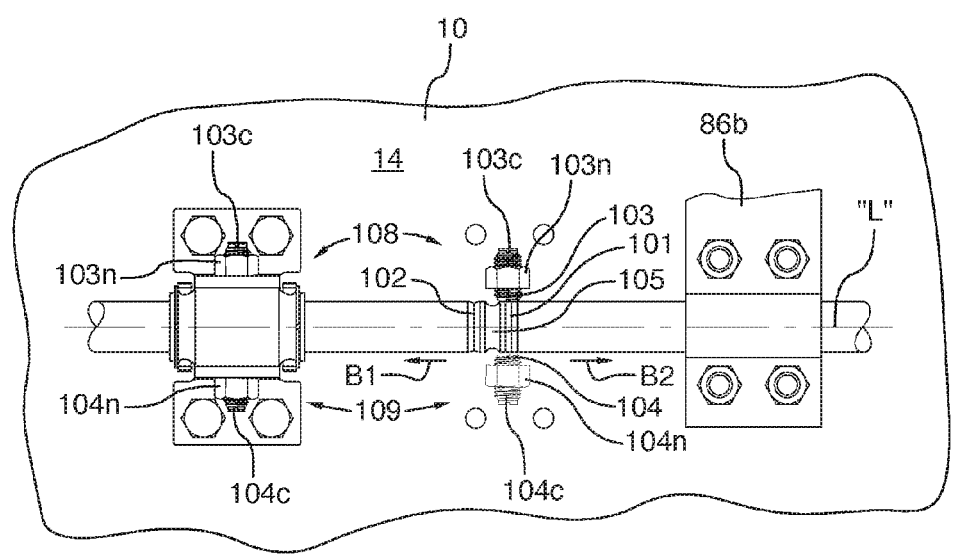
FIG. 4A is an enlarged bottom plan view of a central portion of the dual end remote swivel-lock for caster carts of FIG. 4.
Figure 5A:
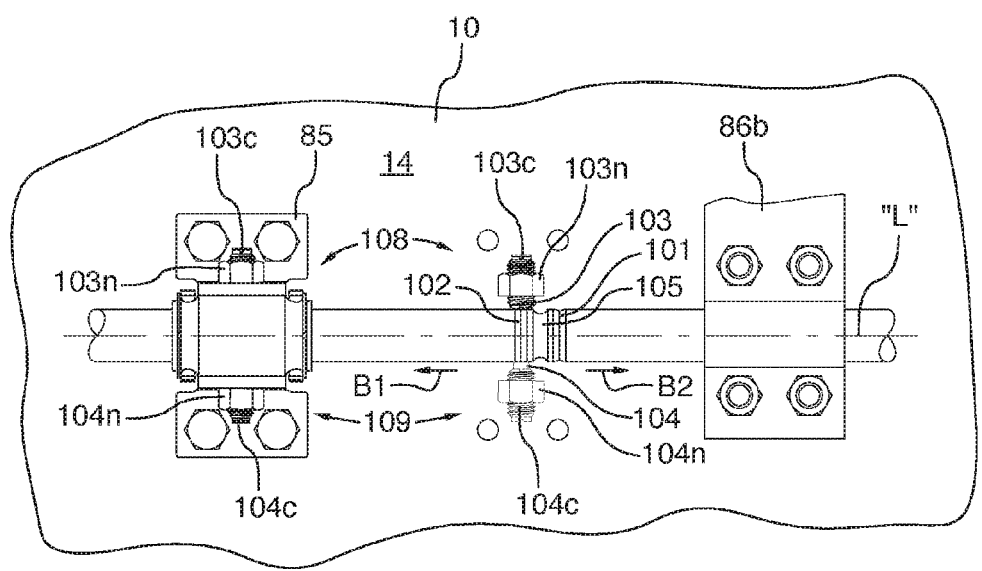
FIG. 5A is an enlarged bottom plan view of a central portion of the dual end remote swivel-lock for caster carts of FIG. 5.

There is also provided according to the invention, an interconnection mechanism 70, for operatively interconnecting the front pivot locking mechanism 110 and the back pivot locking mechanism 120 for synchronized movement one with the other between a front-locked steering configuration, as is best seen in FIGS. 2A, 4 and 4A, and a back-locked steering configuration, as is best seen in FIGS. 2B, 5 and 5A. In the front-locked steering configuration, the front pivot locking mechanism 110 is in its pivot locked configuration and the back pivot locking mechanism 120 is in its pivot unlocked configuration. In contrast, in the back-locked steering configuration, the front pivot locking mechanism 110 is in its pivot unlocked configuration and the back pivot locking mechanism 120 is in its pivot locking configuration. As illustrated in the Figures, the interconnection mechanism 70 comprises a substantially rigid rod member defining a longitudinal axis "L", and having a front rod end 71 and a back rod end 72. The rod member 70 is retained adjacent the bottom surface 14 of the cart 10 by two central mounting brackets 85 for longitudinal sliding movement between the front-locked steering configuration and the back-locked steering configuration. As can be best seen in FIGS. 1, 3, 4 and 5, the front rod end 71 is disposed adjacent the front end 11 of the cart 10 and the back end 72 of the interconnection mechanism 70 is disposed adjacent the back end 12 of the cart 10.

There is also provided a control mechanism 80, as indicated by the general reference numeral 80, connected to the interconnection mechanism 70 for selected movement of the interconnection mechanism 70 between the front-locked steering configuration and the back-locked steering configuration. In the illustrated embodiment, the control mechanism 80 comprises a back foot-operable pedal 81 disposed adjacent the back end 12 of the cart 10 and a front foot-operable pedal 82 disposed adjacent the front end 11 of the cart 10.

Figure 3A:
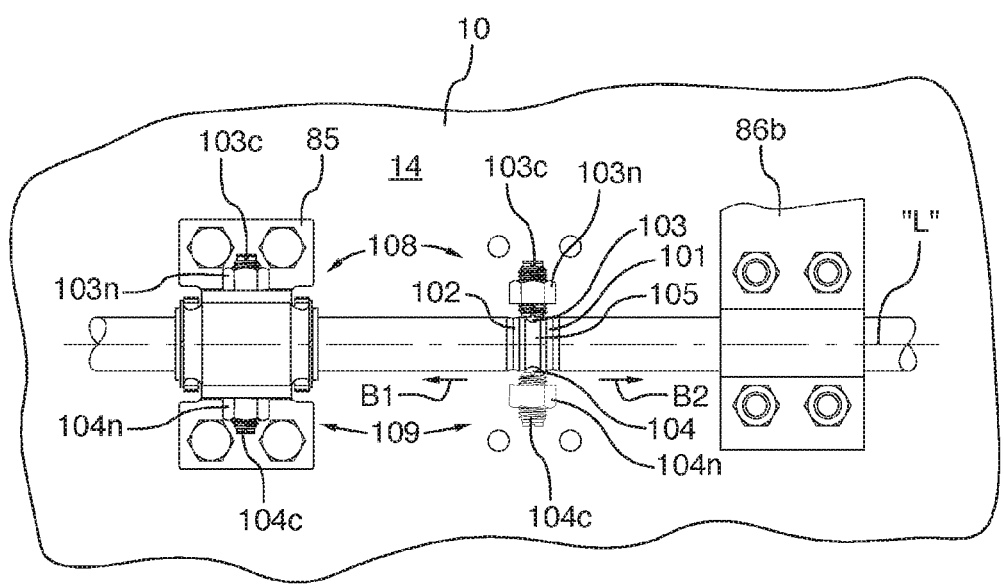
FIG. 3A is an enlarged bottom plan view of a central portion of the dual end remote swivel-lock for caster carts of FIG. 3.

The rod member 70 is slidably movable within the two central mounting brackets 85 by the control mechanism 80 in front and back opposite directions, as indicated by arrows "B1" and "B2", parallel to the longitudinal axis "L", between the front-locked steering configuration and the back-locked steering configuration. Further, there is preferably provided a neutral intermediate unlocked configuration of the rod member 70, as is best seen in FIGS. 1, 3 and 3A. With reference to FIGS. 3, 3A, 4 and 4A, it can readily be seen that the rod member 70 has moved from its neutral intermediate unlocked configuration, as shown in FIGS. 3 and 3A, to its front-locked steering configuration, as shown in FIGS. 3 and 3A.

The back foot-operable pedal 81 is disposed adjacent the back end 12 of the cart 10 and is operatively connected to the back rod end 72 of the rod member 70. More specifically, the back foot-operable pedal 81 has a foot engageable pad portion 81e, a bifurcated main body portion 81m, and a spindle member 81s, and is pivotally mounted on a mounting bracket 81b for movement of the foot engageable portion 81e between a raised position, as is best seen in FIG. 5, and a lowered position, as is best seen in FIG. 4. In the lowered position of the foot engageable portion 81e, which corresponds to the front-locked steering configuration, the front pivot locking mechanism 110 is in its pivot locked configuration and the back pivot locking mechanism 120 is in its pivot unlocked configuration. The back foot-operable pedal 81 is operatively connected to the back rod end 72 of the rod member 70 by a longitudinally adjustable link member 87 and a universal joint coupling 87u.

Similarly, the front foot-operable pedal 82 is disposed adjacent the front end 11 of the cart 10 and is operatively connected to the front rod end 71 of the rod member 70. More specifically, the front foot-operable pedal 82 has a foot engageable pad portion 82e, a bifurcated main body portion 82m, and a spindle member 82s, and is pivotally mounted on a mounting bracket 82b for movement of the foot engageable pad portion 82e between a raised position, as is best seen in FIG. 5, and a lowered position, as is best seen in FIG. 4. In the lowered position of the foot engageable portion 82e, which corresponds to the back-locked steering configuration, the back pivot locking mechanism 120 is in its pivot locked configuration and the front pivot locking mechanism 110 is in its pivot unlocked configuration. The front foot-operable pedal 82 is operatively connected to the back rod end 72 of the rod member 70 by a longitudinally link member 88 and a universal joint 88u. The link member 88 adjustably extends between the universal joint 88u and the spindle member 82s for operative connection therebetween.

In this manner, the back foot-operable pedal 81 and the front foot-operable pedal 82 are mounted as described to drive the movement of the rod member 70 in the aforesaid front and back opposite directions "B1" and "B2" parallel to the longitudinal axis "L", between the front-locked steering configuration and the back-locked steering configuration, upon corresponding pivotal movement of the back and front foot-operable pedals 81,82. It can therefore be seen that the foot operable pedals 81,82 are used to control the longitudinal sliding movement of the elongate connecting rod 70 between its front-locked steering configuration, its back-locked steering configuration, and its neutral intermediate unlocked configuration.

Interconnected by the rod member 70, the back and front foot-operable pedals 81,82 move together—albeit in opposite rotational directions from one another as between their respective raised and lowered positions. That is, when a user at the back end 12 of the cart 10 moves the back foot-operable pedal 81 to its lowered position, the interconnecting rod member 70 will effect movement of the front foot-operable pedal 82 to its raised position. Alternately, a user at the front end 11 of the cart 10 may move the front foot-operable pedal 82 to the raised position, and the interconnecting rod member 70 will then move the back foot-operable pedal 81 to the lowered position. Either way, when the back foot-operable pedal 81 is in the lowered position and the front foot-operable pedal is in the raised position, the cart 10 will be in the front-locked steering configuration with the front pivot locking mechanism 110 in its pivot locked configuration, and with the back pivot locking mechanism 120 in its pivot unlocked configuration.

It will be appreciated that, conversely, the back-locked steering configuration, wherein the front pivot locking mechanism 110 in its pivot unlocked configuration and the back pivot locking mechanism 120 in its pivot locked configuration, may be achieved either by a user at the front end 11 of the cart 10 moving the front foot-operable pedal 82 to its lowered position, or by a user at the back end 12 of the cart 10 moving the back foot-operable pedal 81 to its raised position. Similarly, when a user moves one of the back and front foot-operable pedals 81,82 to its neutral intermediate unlocked position, the other one will also be moved into the same position by action of the interconnecting rod member 70.

Accordingly, it should be appreciated that an operator at either end of the cart 10 can, without needing to switch ends, selectively use the steering locking mechanism 20 to move between (a) the front-locked steering configuration, (b) the neutral intermediate unlocked steering configuration, and (c) the back-locked steering configuration. Such selective control may make the cart 10 readily and accurately steerable, from either end, which can be highly advantageous in carting heavy loads in narrow corridors and otherwise.

The elongate connecting rod 70 is operatively connected to the front pivot locking mechanism 110 mounted at the front right caster 31 at the front end 11 of the cart 10 by a front adjustable lateral arm member 86a securely connected to the elongate connecting rod 70 for longitudinal movement therewith. The front lateral arm member 86a carries two forwardly projecting parallel tongue members 92 and 93. The vertical pin 94 mounted at the end of the plunger 55 is slidably engaged, as previously described, with the longitudinal slots 92a and 93a formed in each of the parallel tongue members 92 and 93, respectively, to drive the plunger 55.

Similarly, the elongate connecting rod 70 is operatively connected to the back pivot locking mechanism 120 mounted at the back left caster 34 at the back end 12 of the cart 10 by a back adjustable lateral arm member 86b securely connected to the elongate connecting rod 70 for longitudinal movement therewith in the same general manner as described above in relation to the front lateral arm member 86a.

The selectively operable steering locking mechanism 20 further comprises a steering configuration retention mechanism 100, as best seen in FIGS. 3 through 6C. The steering configuration retention mechanism 100 is for releasably holding the interconnecting mechanism 70 in the front-locked steering configuration and for releasably holding the interconnecting mechanism 70 in the back-locked steering configuration. The steering configuration retention mechanism 100 comprises one or more front-locked detents 101 located on the rod member 70 to correspond with the front-locked steering configuration, as is best seen in FIG. 4A, and one or more back-locked detents 102 located on the rod member to correspond with the back-locked steering configuration, as is best seen in FIG. 4A. Preferably, the number of the front-locked detents 101 and the number of the back-locked detents 102 is equal one to the other. In the illustrated embodiment, there are two front-locked detents 101 located on the rod member 70 and two back-locked detents 102 located on the rod member 70. Further, there is a set of two optional neutral intermediate unlocked detents 105 disposed one neutral intermediate unlocked detent 105 between each set of front-locked detents 101 and back-locked detents 102. One set of the front-locked detents 101, back-locked detents 102, and neutral intermediate unlocked detents 105 is covered in the Figures by a mounting bracket 85 and is not viewable. The other of the two sets of the front-locked detents 101, back-locked detents 102, and neutral intermediate unlocked detents 105 is viewable, since the corresponding mounting bracket 85, has been removed for ease of illustration.

There is also seen in the Figures one or more detent engagement mechanisms 108,109 mounted on the cart 10 for spring biased releasable radial engagement with: the one or more front-locked detents 101 when the rod member 70 is in the front-locked steering configuration; the one or more back-locked detents 102 when the rod member 70 is in the back-locked steering configuration; and, the one or more neutral intermediate unlocked detents 105 when the rod member 70 is mid-way in between the front-locked steering configuration and the back-locked steering configuration at which neutral intermediate unlocked configuration, all of the casters 31,32,33 and 34 are free to swivel about their respective vertical axes 31v,32v,33v and 34v.

There is also preferably provided a first set of detent engagement mechanisms 108 mounted to the left of the rod member 70, and a second set of detent engagement mechanisms 109 mounted to the left of the rod member 70 in opposed alignment with the first set of detent engagement mechanisms 108. Preferably, there is a detent engagement mechanism 108 for each set of front-locked detents 101, and for back-locked detents 102, and a detent engagement mechanism 109 for each set of front-locked detents 101 and for back-locked detents 102.

Figure 6A:
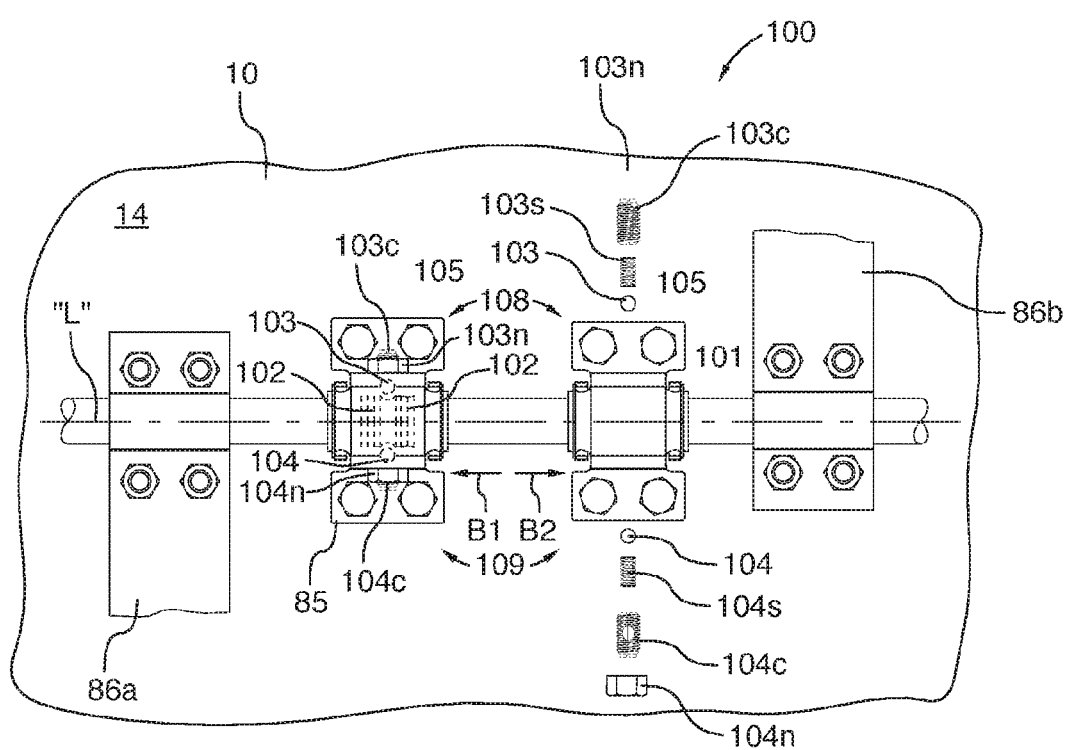
FIG. 6A is an enlarged bottom plan view of a central portion of the dual end remote swivel-lock for caster carts of FIG. 1, showing a steering configuration retention mechanism thereof in a partially exploded view.
Figure 6B:
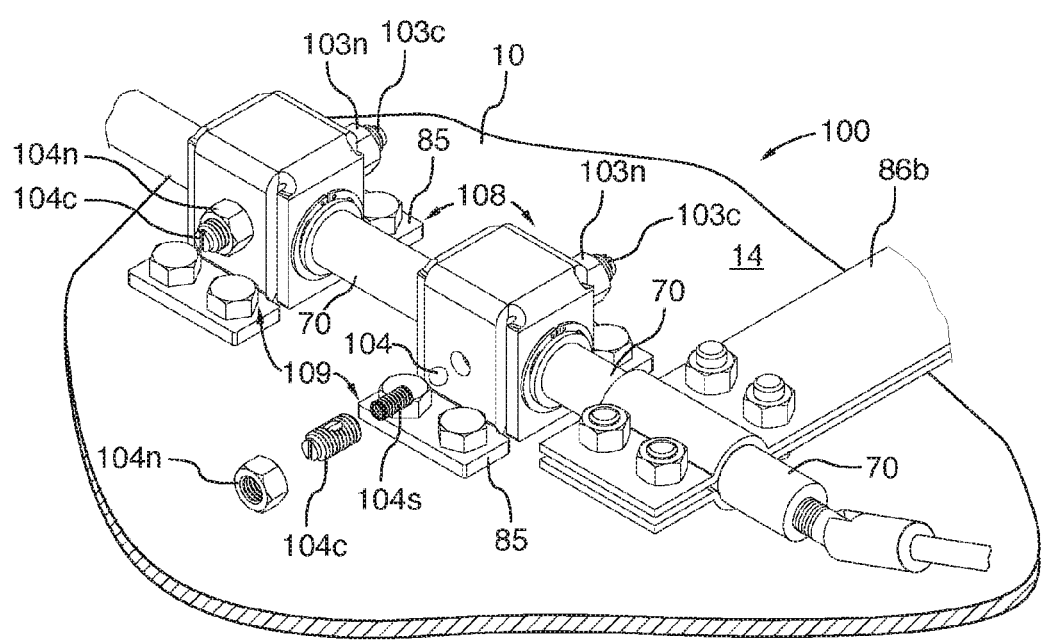
FIG. 6B is an enlarged bottom back left perspective, partially exploded view of the steering configuration retention mechanism of FIG. 6A.
Figure 6C:
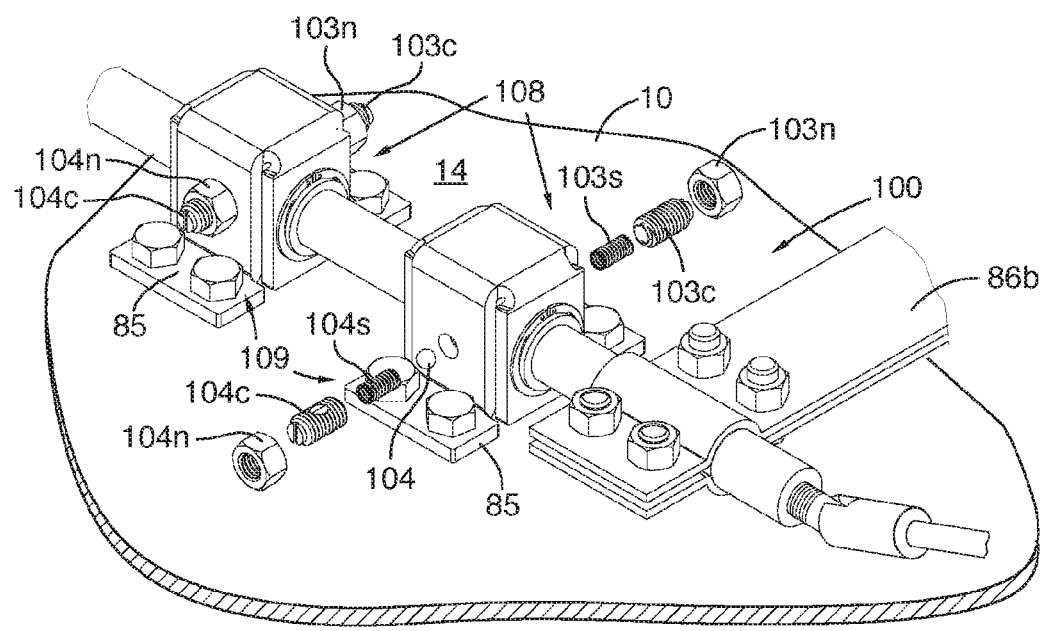
FIG. 6C is an enlarged bottom back left perspective, further partially exploded view of the steering configuration retention mechanism of FIG. 6A.

Each of the detent engagement mechanisms 108 preferably comprises a detent ball bearing 103 captured within a threaded cylinder 103c held in place on the mounting bracket 85 by a co-operating nut 103n and biased into position by a co-operating spring 103s (See FIG. 6a). Similarly, each of the detent engagement mechanisms 109 preferably comprises a detent ball bearing 104 captured within a threaded cylinder 104c held in place on the mounting bracket 85 by a co-operating nut 104n and biased into position by a co-operating spring 104s.

In use, when the foot engageable pad portion 81e of the back foot-operable pedal 81 is pressed downwardly, the elongate connecting rod 70 moves forwardly (in the direction of arrow $B_1$, thus moving the front lateral arm member 86a and the lateral arm member 86b forwardly. The parallel tongue members 92 and 93 then move forwardly to cause drive pin 94 to move forwardly as well, which motion drives plunger member 55 (through the agency of drive pin 94) to move forwardly to engage the slot 31d of the front right caster 31, thereby precluding swiveling motion of the front right caster 31 about its vertical axis 31v. The plunger 55 has a rearwardly directed step flange, and is spring-loaded (biased) to extend forward under the urging of coil spring 95 contacting the step flange, thereby automatically extending the plunger 55 forward when back foot-operable pedal 81 is pressed downwardly. The positioning of the slots 92a and 93a on the parallel tongue members 92 and 93 allows the pin 94 and plunger 55 to remain in an "unengaged" position, as when the vertical slots 31d are not aligned with the plunger 55, (as seen in FIG. 2b) in which the head of plunger 55 remains pressed against the circumferential outer wall of base configuration 31c of the caster, and only "engages" with the vertical slot 31d when they become aligned on initial swiveling motion of the front caster 31 upon initial movement of the cart 10 by an operator. In this configuration, the rear casters 33,34 can still swivel, thereby permitting easy rear steering (i.e., from the back end 12) of the cart 10 by an operator. This is a front-locked steering configuration. If a second front swivel lockable caster is needed for a particular cart application, a similar front lateral arm member (not shown) and supplemental pivot locking mechanism may be analogously employed to lock and unlock the second front swivel lockable caster to selecting control swiveling about its vertical axis 32v.

Similarly, when the foot engageable pad portion 82e of the front foot-operable pedal 82 is pressed downwardly, past the neutral position, to its end of downward travel, the elongate connecting rod 70 moves rearwardly (in the direction of arrow $B_2$), thus moving the rear lateral arm member 86b and the front lateral arm member 86a rearwardly. The slots 92a and 93a formed in parallel tongue members 92 and 93 also move rearwardly to cause the drive pin 94 and the connected plunger member 55 to move in the same direction, thereby disengaging the vertical slot 31d of the front caster 31, to allow free swiveling motion of the caster 31 about its vertical axis 31v. The front casters 31 and 32 can now both swivel, thereby permitting front steering of the selectively operable steering locking mechanism. Moreover, the back or rear caster 34 is now precluded from swiveling about its vertical axis 34v. The swivel lock mechanism 120 of the rear caster 34 is the exact mirror of that associated with the front caster 31, and for this reason will not be discussed separately. This is the back-locked steering configuration. If a second rear swivel lockable caster is required by a particular cart application, a second rear arm member (not shown) and a supplemental pivot locking mechanism may be analogously employed to lock and unlock such caster, to selectively control swiveling about its vertical axis 33*v*.

The front-locked steering configuration and the back-locked steering configuration are mutually exclusive one from the other, so that either the front wheels 31,32 are precluded from swiveling, or the back (or rear) wheels 33,34 are precluded from swiveling. If the cart 10 is in the front-locked steering configuration, one or both of the front caster(s) 31,32 at the front end 11 are not swivelable, but the rear casters 33,34 are both swivelable. Accordingly, the selectively operable steering locking mechanism can readily and accurately be steered by an operator from the back end 12. If the cart 10 (at the back end 12) is in the back-locked steering configuration, one or both the rear caster(s) 33,34 (at the back end 12) are not swivelable, but the front casters 31,32 (at the front end 11) are both swivelable. Accordingly, the selectively operable steering locking mechanism 20 can readily and accurately be steered by an operator from the front end 11 of the cart 10. There is also preferably provided an "in-between" mode (configuration), which is called the neutral intermediate unlocked mode (configuration) as previously described, whereat none of the casters 31,32,33,34, are locked against swiveling.

The system can switch between each of the three indicated configurations (modes) according to the user's intention, and the steering configuration retention mechanism previously described preferably secures the system into one of the three configurations (modes), once same is engaged.

The central mounting brackets 85 are not only configured and adjusted for holding and guiding rod 70 in its longitudinal sliding motion, but also for retaining the rod 70 in a specific configuration corresponding to one of the three configurations (modes) described hereinabove. This steering configuration retention mechanism is designed to resist any vibration or shock that potentially could shift the system out of a configuration previously selected by an operator, which intentional shifting is particularly dangerous with large or heavy push carts. The spring-loaded mechanism described and illustrated can be easily adjusted to the desired resistance force.

The above described system can be readily adapted for use with any dimension of carts or trailers that roll on casters, due to its modular design. To compensate for larger carts, none of the existing components except the rod member 70 and the lateral arm members 86*a* and 86*b* may need to be modified. In this regard, customizable adaptor(s) may be employed on the first and/or back ends of the rod 70 to adjust for additional length for the rod member. For a cart or trailer system that has a greater width, an adaptor may also be added on one, or both, of the lateral arms 86*a* and 86*b* to compensate for extra width.

Figure 7:
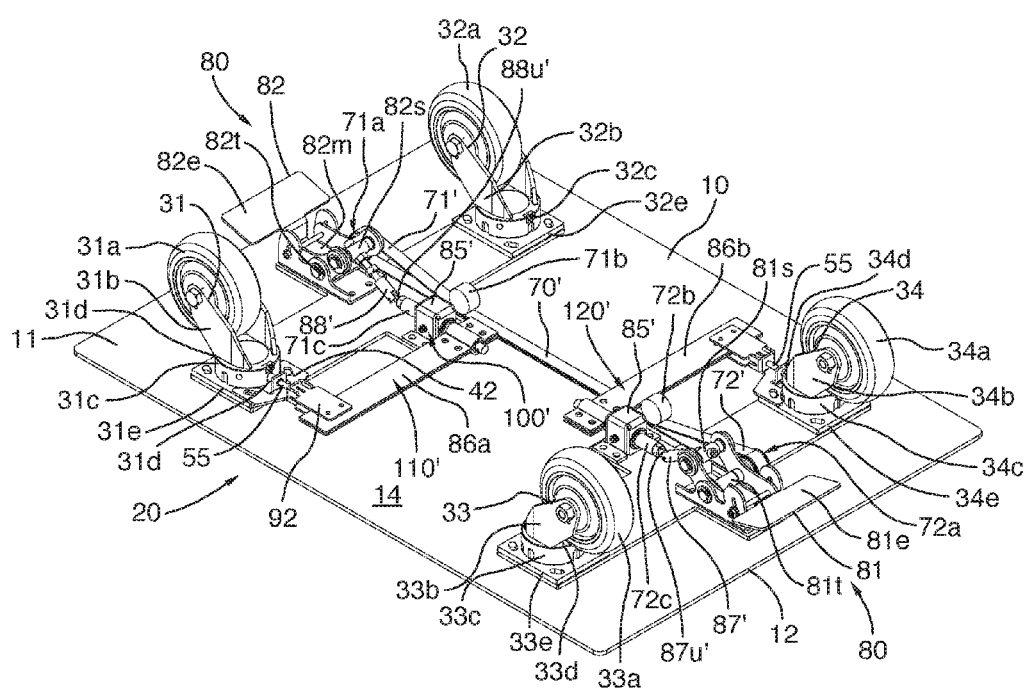
FIG. 7 is a bottom back left perspective view of a dual end remote swivel-lock for caster carts according to another preferred embodiment of the present invention.
Figure 8:
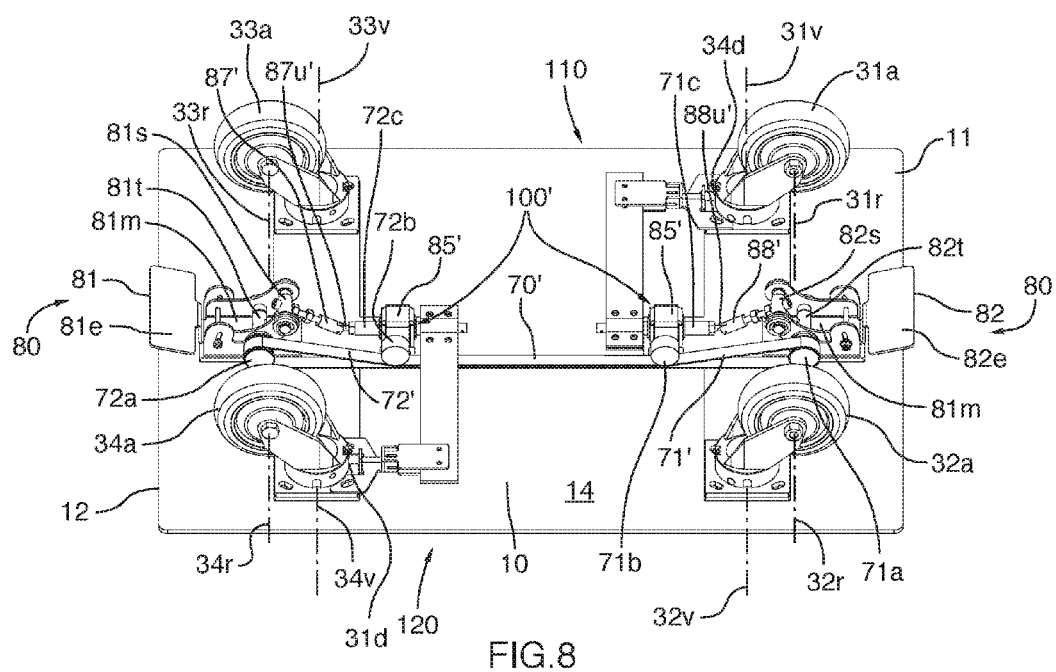
FIG. 8 is a bottom right perspective view of the swivel-lock for caster carts of FIG. 7.
Figure 9:
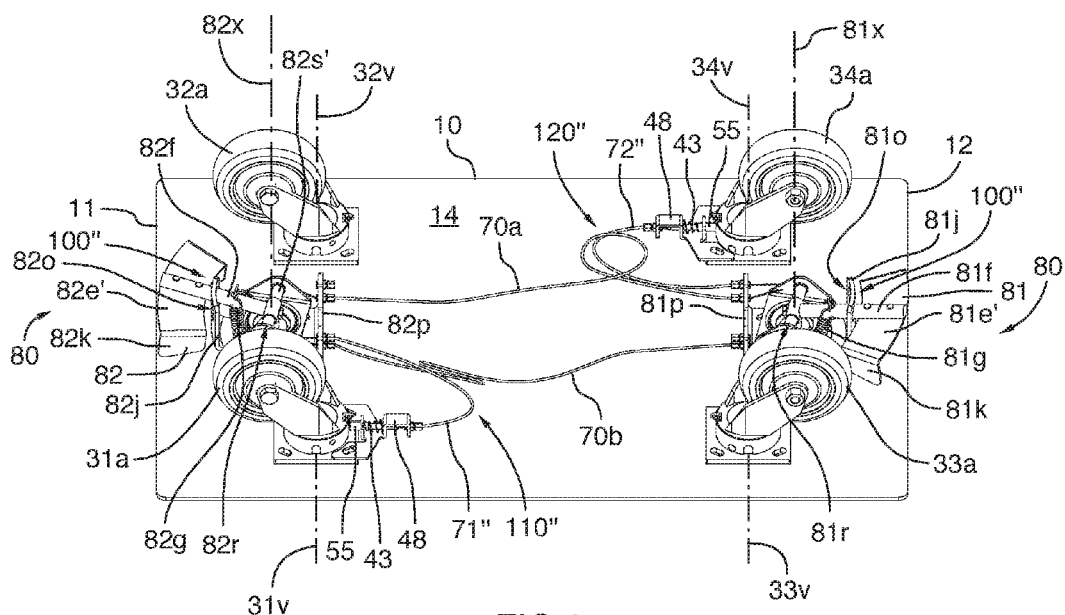
FIG. 9 is a bottom left perspective view of a dual end remote swivel-lock for caster carts according to a further preferred embodiment of the present invention.
Figure 10:
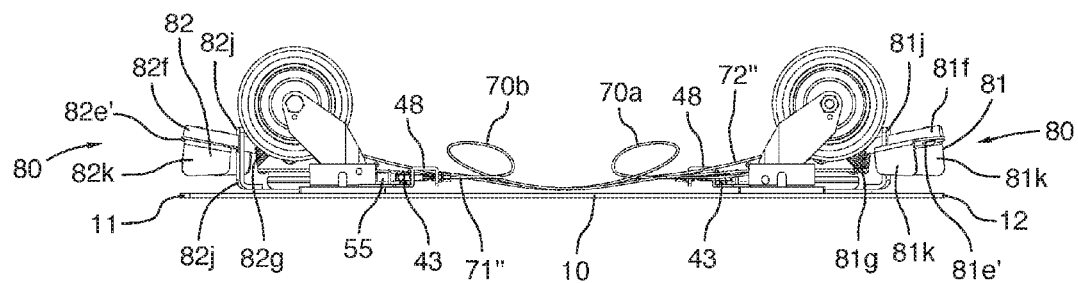
FIG. 10 is a left side elevational view of the swivel-lock for caster carts of FIG. 9.

Turning now to FIGS. 7 and 8, these drawings show a dual end remote swivel-lock mechanism 20 for a caster cart 10 according to another preferred embodiment of the present invention, wherein another preferred interconnection mechanism (in the form of a belt member) 70' has a front belt portion 71' disposed about a front pulley member 71*a* adjacent the front portion 11, and a back belt portion 72' disposed about a back pulley member 72*a* adjacent the back portion 12 of the cart 10. It should perhaps be noted that FIG. 7 is a bottom back left perspective view of the mechanism 20 on the cart 10, whereas FIG. 8 is a bottom right perspective view (i.e., from the other side). Now, as shown in FIGS. 7 and 8, the control mechanism 80 includes front and back foot-operable pedals 82,81 disposed adjacent the front and back portions 11,12 of the cart 10.

In view of the teachings and disclosures herein, persons skilled in the art may appreciate that certain common teachings and disclosures herein in connection with the embodiment depicted in FIGS. 1 to 6C (e.g., with respect to its front and back pivot locking mechanisms 110,120, control mechanism 80, neutral intermediate unlocked configuration, and/or steering configuration retention mechanism 100) may also apply equally, and/or with such changes as may be appropriate and readily appreciated by persons skilled in the art, to the further embodiment depicted in FIGS. 7 and 8 and, accordingly, such teachings and disclosures will not be separately repeated in detail herein.

For the embodiment depicted in FIGS. 7 and 8, however, it should be appreciated that the front pulley member 71*a* and the back pulley member 72*a* rotate with and are driven by the belt member 70' in front and back opposite directions between the front-locked and back-locked steering configurations. As shown in FIGS. 7 and 8, a front spindle member 82*t* of the front foot-operable pedal 82 is operatively connected to the front pulley member 71*a*, and a back spindle member 81*t* of the back foot-operable pedal 81 is operatively connected to the back pulley member 72*a*, to drive the aforesaid rotation of the front and back pulley members 71*a*,72*a* with and by the belt member 70', in the aforesaid front and back opposite directions between the front-locked steering configuration and the back-locked steering configuration as aforesaid, upon corresponding movement of the front and back foot-operable pedals 82,81.

Front and back pivot locking mechanisms 110',120' in this embodiment of the selectively operable steering locking mechanism 20 are substantially identical one to the other in terms of structure and function. Each of the front and back pivot locking mechanisms 110',120' has a spring-biased plunger member 55 which precludes a respective caster 31,34 from pivoting about its substantially vertical pivot axis 31*v*,34*v* in its pivot locked configuration—i.e., in the same manner as described above in association with the embodiment depicted in FIGS. 1 to 6C. Similarly, each of the front and back pivot locking mechanisms 110',120' can selectively free its respective caster 31,34 to pivot about its substantially vertical pivot axis 31*v*,34*v* in its pivot unlocked configuration.

In the embodiment shown in FIGS. 7 and 8, substantially rigid front and back rod members 71*c*,72*c* are respectively disposed adjacent the front and back portions 11,12 of the cart 10.

Each of the front and back foot-operable pedals 82,81 is operatively connected to its respective front or back rod member 71*c*,72*c* by a longitudinal link member 88',87' and a universal joint 88*u'*,87*u'*. Each link member 88',87' adjustably extends between the universal joint 88*u'*,87*u'* and the spindle member 82*s*,81*s* for operative connection therebetween.

Each of the front and back rod members 71*c*,72*c* is securely connected by a respective front or back adjustable lateral arm member 86*a*,86*b* for longitudinal movement therewith and operative connection, via the spring-biased plunger 55 as aforesaid, to its respective caster 31,34.

It should be appreciated that, for the embodiment depicted in FIGS. 7 and 8, when a user at the back end 12 of the cart 10 moves the back foot-operable pedal 81 towards its lowered position, the belt member 70' will effect movement of the front foot-operable pedal 82 towards its raised position, and vice versa.

In use, when the foot engageable pad portion 81e of the back foot-operable pedal 81 is pressed downwardly, the back rod member 72c moves forwardly, thus moving the back lateral arm member 86b forwardly. At the same time, the downward movement of the back foot-operable pedal 81 rotates the belt member 70' about the pulleys 72a and 71a, thus moving the front foot-operable pedal 82 upwardly and moving the front lateral arm member 86a forwardly. In this manner, the plunger member 55 precludes swiveling motion of the front right caster 31 about its vertical axis 31v, in the front-locked steering configuration, permitting the rear casters 33,34 to swivel and easy rear steering (i.e., from the back end 12) of the cart 10 by the operator.

Similarly, when the foot engageable pad portion 82e of the front foot-operable pedal 82 is pressed downwardly, past a neutral position, the front rod member 71c moves rearwardly, thus moving the front lateral arm member 86a rearwardly. At the same time, the downward movement of the front foot-operable pedal 82 rotates the belt member 70' about the pulleys 71a and 72a, thus moving the back foot-operable pedal 81 upwardly and moving the back lateral arm member 86b rearwardly. In this manner, the plunger member 55 precludes swiveling motion of the back left caster 34 about its vertical axis 34v, in the back-locked steering configuration, permitting the front casters 31,32 to swivel and easy front steering (i.e., from the front end 11) of the cart 10 by the operator.

A preferred steering configuration retention mechanism 100' in this embodiment includes front-locked and back-locked detents (substantially identical to those shown in detail in FIGS. 3A, 4A and 5A) located on the front and back rod members 71c,72c, respectively, to correspond with the front-locked and back-locked steering configurations. Two detent engagement mechanisms 85',85' are mounted on the cart 10 for spring-biased releasable radial engagement with the front-locked and back-locked detents (substantially identical to those shown in detail in FIGS. 3A, 4A and 5A), respectively, when the front and back rod members 71c,72c are in the front-locked and back-locked steering configurations.

The detent engagement mechanisms (under the mounting brackets) 85',85' of the steering configuration retention mechanism 100' are not only configured and adjusted for holding and guiding the front and back rod members 71c,72c in their longitudinal sliding motion, but also for retaining the rod members 71c,72c in specific configurations corresponding to the front-locked and back-locked steering configurations (and the neutral intermediate unlocked configuration) described hereinabove.

Next, FIGS. 9 to 13 show a dual end remote swivel-lock mechanism 20 for a caster cart 10 according to a further preferred embodiment of the present invention, wherein a further preferred interconnection mechanism (in the form of flexible cable members) 70" has front and back cable members 71",72" disposed adjacent the front and back portions 11,12, and interconnecting cable members 70a,70b running between the front and back portions 11,12 of the cart 10. Preferably, the front and back cable members 71",72" and the interconnecting cable members 70a,70b may be Bowden cables or another flexible cable which transmits mechanical force in movement of an inner cable relative to a hollow outer cable housing or sheath. As shown in FIGS. 9 to 12, the control mechanism 80 includes front and back foot-operable pedals 82,81 disposed adjacent the front and back portions 11,12 of the cart 10.

For the embodiment depicted in FIGS. 9 to 13, however, it should be appreciated that the front and back cable members 71",72" are movable by the control mechanism 80 in front and back opposite directions between the front-locked and back-locked steering configurations. As shown in FIGS. 9 to 12, the front foot-operable pedal 82 is operatively connected to the front cable member 71", and the back foot-operable pedal 81 is operatively connected to the back cable member 72", to drive the aforesaid movement of the front and back cable members 71",72", in the aforesaid front and back opposite directions between the front-locked and back-locked steering configurations, upon corresponding movement of the front and back foot-operable pedals 82,81.

Each of the front and back foot-operable pedals 82,81 is mounted on a respective pedal pivot member 82r,81r thereof, for selective rotation of each, in the substantially horizontal plane, about a respective vertical pedal rotation axis 82x,81x. In use, foot engageable pad portions 82e,81e and side portions 82k,81k of the front and back foot-operable pedals 82,81 may be engaged and pressed in a port or starboard direction to selectively rotate them, each along with a respective spindle member 82s',81s' thereof, about the vertical pedal rotation axes 82x, 81x.

Figure 11:
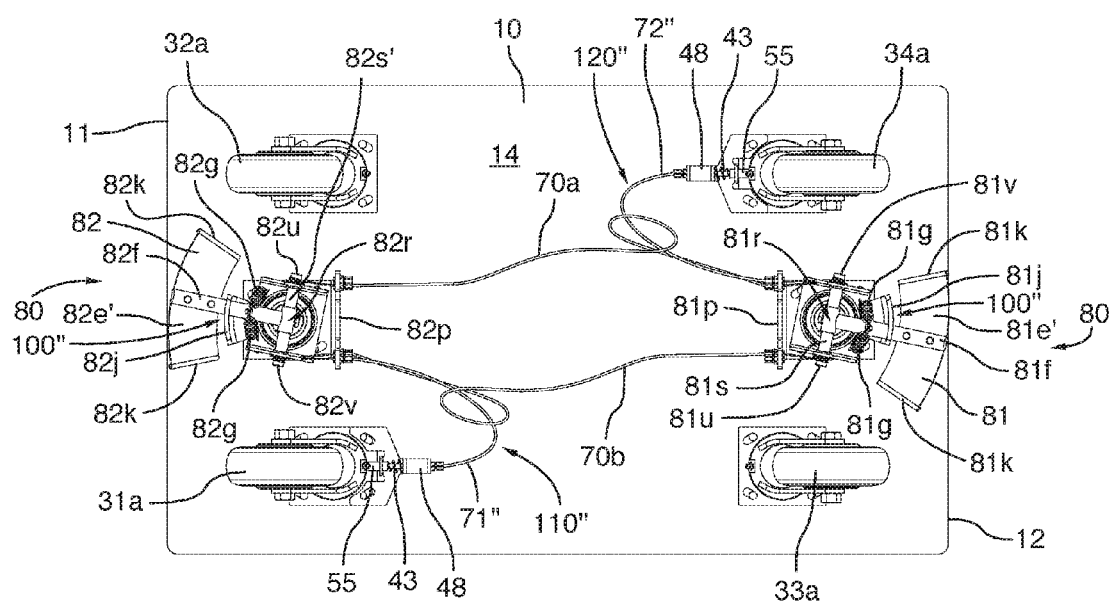
FIG. 11 is a bottom plan view of the swivel-lock for caster carts of FIG. 9.
Figure 12:
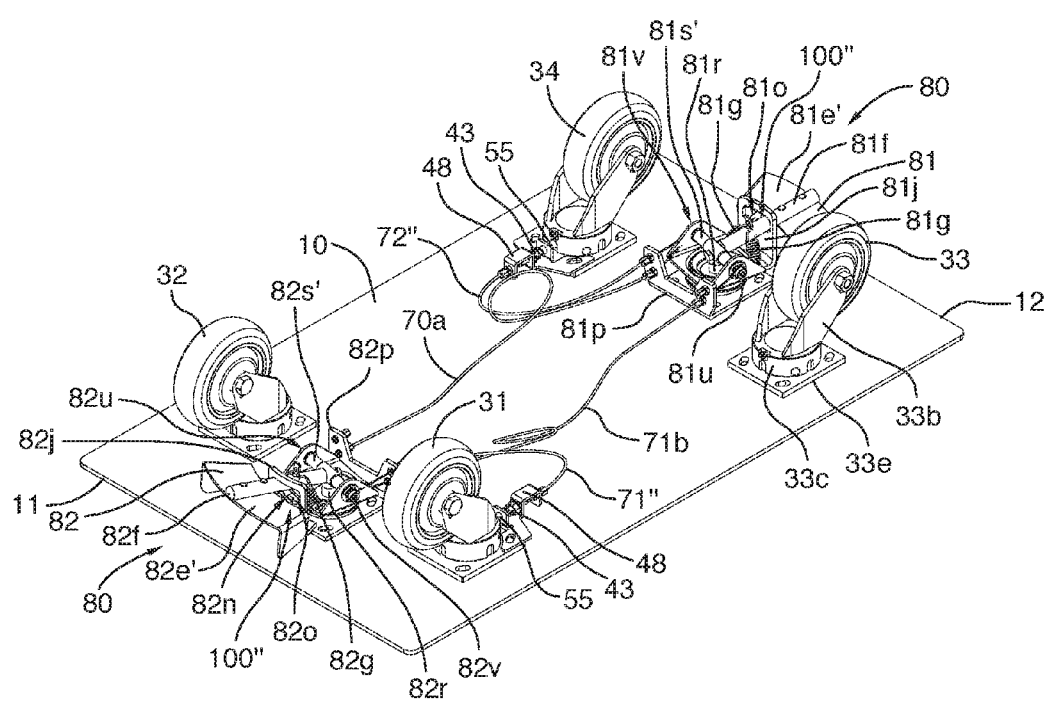
FIG. 12 is a bottom front left perspective view of the swivel-lock for caster carts of FIG. 9.
Figure 13:
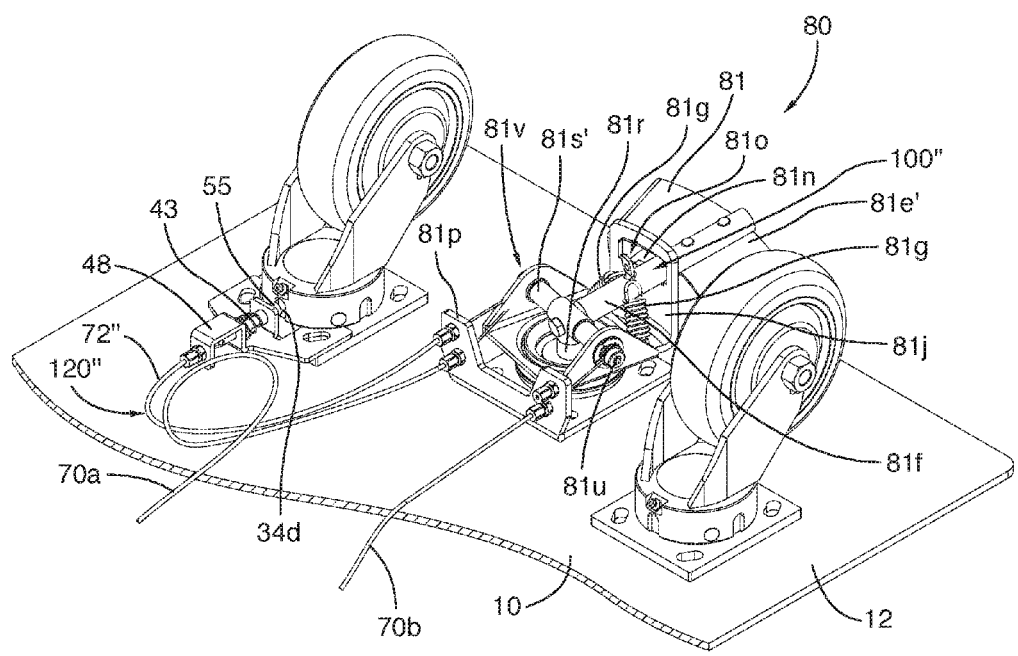
FIG. 13 is an enlarged bottom front left perspective view of a back portion of the swivel-lock for caster carts of FIG. 12.

On the left side (when viewed from the top) of the cart 10, one of the interconnecting cable members 70a is connected to, and runs between, left side portions 82u,81v of the front and back spindle members 82s',81s' provided on the front and back foot-operable pedals 82,81 respectively—as can be best seen, from below, in FIG. 11. Similarly, on the right side of the cart 10, the other one of the interconnecting cable members 70b is connected to, and runs between, the right side portions 82v,81u of the front and back spindle members 82s',81s' provided on the front and back foot-operable pedals 82,81 respectively. Also, the front cable member 71" is connected to the right side portion 82v of the front spindle member 82s' on the front foot-operable pedal 82, the back cable member 72" is connected to the left side portion 81v of the back spindle member 81s' on the back foot-operable pedal 81. Front and back cable mounting plates 82p,81p are additionally provided on the cart 10 to connect and secure the interconnecting cable members 70a,70b and the front and back cable members 71",72" in place.

The front cable member 71" is operatively connected to a front pivot locking mechanism 110", and the back cable member 72" is operatively connected to a back pivot locking mechanism 120", each by a respective bracket 48.

The front and back pivot locking mechanisms 110",120" in this embodiment of the selectively operable steering locking mechanism 20 are substantially identical one to the other in terms of structure and function. Each of the front and back pivot locking mechanisms 110",120" has a spring-biased plunger member 55 which precludes a respective caster 31,34 from pivoting about its substantially vertical pivot axis 31v,34v in its pivot locked configuration—i.e., in the same manner as described above in association with the embodiments depicted in FIGS. 1 to 8. Similarly, each of the front and back pivot locking mechanisms 110",120" can selectively free its respective caster 31,34 to pivot about its substantially vertical pivot axis 31v,34v in its pivot unlocked configuration.

In view of the teachings and disclosures herein, persons skilled in the art may appreciate that certain common teachings and disclosures herein in connection with the different embodiments depicted in FIGS. 1 to 8 (e.g., with respect to their front and back pivot locking mechanisms 110,120, control mechanisms 80, front and back pivot locked and unlocked configurations, neutral intermediate unlocked configuration, and/or out-of-phase movement of the back and front foot-operable pedals 81,82) may also apply equally, and/or with such changes as may be appropriate and readily appreciated by persons skilled in the art, to the additional embodiment depicted in FIGS. 9 to 13 and, accordingly, such teachings and disclosures will not be separately duplicated in detail herein.

Pushing the back foot-operable pedal 81 towards the right side of the cart 10 (as seen in FIGS. 9 to 13) rotates it and its spindle member 81s' about its rotation axis 81x, thus moving the back cable member 72" within its hollow outer cable housing, such that the plunger member 55 of the back pivot locking mechanism 120" is withdrawn from vertical slot 34d thereby permitting swiveling motion of the back left caster 34 about its vertical axis 34v. At the same time, the interconnecting cable members 70a,70b transmit motion to the front pedal 82 which then rotates about its rotation axis 82x and moves the front cable member 71" and the plunger member 55 of the front pivot locking mechanism 110" to preclude swiveling motion of the front right caster 31 about its vertical axis 31v, in the front-locked steering configuration, thus permitting easy rear steering (i.e., from the back end 12) of the cart 10 by the operator.

Pushing the front foot-operable pedal 82 towards the right side of the cart 10 (not shown) rotates it and its spindle member 82s' about its rotation axis 82x, thus moving the front cable member 71" within its hollow outer cable housing, such that the plunger member 55 of the front pivot locking mechanism 110" is withdrawn from vertical slot 31d thereby permitting swiveling motion of the front right caster 31 about its vertical axis 31v. At the same time, the interconnecting cable members 70a,70b transmit motion to the back pedal 81 which then rotates about its rotation axis 81x and moves the back cable member 72" and the plunger member 55 of the back pivot locking mechanism 120" to insert the plunger member 55 into the vertical slot 34d so as to preclude swiveling motion of the back left caster 34 about its vertical axis 34v, in the back-locked steering configuration, thus permitting easy front steering (i.e., from the front end 11) of the cart 10 by the operator.

Accordingly, it should be appreciated that, for the embodiment depicted in FIGS. 9 to 13, when a user at the back end 12 of the cart 10 moves the back foot-operable pedal 81 towards its position on the right side of the cart 10, the interconnecting cable members 70a,70b effect movement of the front foot-operable pedal 82 towards its position on the left side of the cart 10, and vice versa.

In the embodiment shown in FIGS. 9 to 13, a preferred steering configuration retention mechanism 100" includes front and back retention plate members 82j,81j mounted on the cart adjacent the front and back ends 11,12 of the cart 10 respectively. Each of the retention plate members 82j,81j is respectively shaped to define an opening 82o,81o therethrough and a set of notches 82n,81n. Notch engagement mechanisms (preferably in the form of front and back pedal rod members) 82f,81f are mounted on the front and back foot-operable pedals 82,81. Each of the front and back pedal rod members 82f,81f extends through a respective one of the openings 82o,81o. Preferably, each of the front and back pedal rod members 82f,81f is spring-biased, by a respective set of pedal spring members 82g,82g 81g,81g, into releasable engagement with a respective one set of the notches 82n,81n. Preferably, each aforesaid set of notches 82n,81n may include a front-locked notch and a back-locked notch, respectively, corresponding with the front-locked and back-locked steering configurations.

The front and back pedal rod members 82f,81f and the notches 82n,81n formed in the front and back retention plate members 82j,81j of the steering configuration retention mechanism 100" are not only configured and adjusted for holding and guiding the front and back foot-operable pedals 82,81 in their rotational motion about their respective pedal rotation axes 82x,81x, but also for retaining the pedals 81,81 in specific configurations corresponding to the front-locked and back-locked steering configurations (and the neutral intermediate unlocked configuration) described hereinabove.

In use, a user at the back end 12 of the cart 10 may depress the back foot-operable pedal 81 out of engagement with the notches 81n, before pushing the pedal 81 towards the left or right side of the cart 10 and then releasing it back into spring-biased engagement with the notches 81n which correspond with the desired steering configuration. In doing so, through action of the interconnecting cables 70a,70b, the user also urges the front foot-operable pedal 82 into corresponding movement between its notches 82n. Conversely, a user at the front end 11 of the cart 10 may depress the front foot-operable pedal 82 out of engagement with the notches 82n, before pushing the pedal 82 towards the left or right side of the cart 10 and then releasing it back into spring-biased engagement with the notches 82n which correspond with the desired steering configuration and, through action of the interconnecting cables 70a,70b, urge the back foot-operable pedal 81 into corresponding movement between its notches 81n.

Persons skilled in the art will appreciate, in view of the disclosures herein, that although various preferred embodiments of the present invention have been described and depicted in FIGS. 1 to 13 in use on a rectangular cart, the invention is not so limited. For example a triangular cart or a cart with only three (3) casters may also be equipped with a selectively operable steering locking mechanism according to the present invention. Similarly, carts with more than four (4) sides or with more than four (4) casters may also be equipped with a selectively operable steering locking mechanism according to the present invention.

Also, persons skilled in the art will appreciate, in view of the disclosures herein, that although various preferred embodiments of the present invention have been described and depicted in FIGS. 1 to 13 in use with foot-operable pedals 81,82, the invention and its potential control mechanisms are not so limited. For example, persons skilled in the art will appreciate, in view of the teachings and disclosures herein, that various hand-actuated control mechanisms also may fall within the scope of the invention.

In view of the disclosures herein, it should be appreciated that the present invention provides a push cart which may be used to carry heavy loads, such as industrial and medical equipment, inside buildings having corridors and hallways, which is readily and accurately steerable from either end of the cart, without requiring the operator to switch ends, to avoid damage to structures or injury to personnel located within such corridors and hallways. The present invention advantageously affords selection of caster swivelling as between the ends of the cart. Additionally, the present invention provides a sturdy mechanical control device for selectively locking either (one or more) front casters, or (one or more) rear casters, while the opposite end casters remain free to rotate about a vertical axis, with such control device being readily operable by one or more users from either end, or both ends, of the cart. A cart equipped according to the present invention advantageously permits selection of one of the following alternatives: (a) all casters being swivelable; (b) the front casters being swivelable, and one or more back casters each being locked against rotation about a respective vertical axis; or (c) the back casters being swivelable, and one or more front casters each being locked against rotation about its respective vertical axis.

Other modifications and alterations may be used in the design and manufacture of other embodiments according to the present invention without departing from the spirit and scope of the invention, which is limited only by the accompanying claims.

We claim:

1. A selectively operable steering locking mechanism for a cart which is adapted for front and back travel and which has a front portion and a back portion opposite the front portion, a front left caster and a front right caster each disposed adjacent the front portion of the cart, and a back left caster and a back right caster each disposed adjacent the back portion of the cart, wherein each of said front left caster, said front right caster, said back left caster, and said back right caster is freely pivotable about a respective substantially vertical pivot axis, with said selectively operable steering locking mechanism comprising:
   a front pivot locking mechanism selectively movable between: a front pivot locked configuration whereat at least one of said front left caster and said front right caster is precluded from pivoting about its said respective substantially vertical pivot axis; and a front pivot unlocked configuration whereat said at least one of said front left caster and said front right caster is free to pivot about its said respective substantially vertical pivot axis;
   a back pivot locking mechanism selectively movable between: a back pivot locked configuration whereat at least one of said back left caster and said back right caster is precluded from pivoting about its said respective substantially vertical pivot axis; and a back pivot unlocked configuration whereat said at least one of said back left caster and said back right caster is free to pivot about its said respective substantially vertical pivot axis;
   an interconnection mechanism comprising one or more flexible cable members having a front cable portion disposed adjacent said front portion of said cart and a back cable portion disposed adjacent said back portion of said cart for operatively interconnecting said front pivot locking mechanism and said back pivot locking mechanism for synchronized movement, one with the other, between:
   a) a front-locked steering configuration whereat said front pivot locking mechanism is in said front pivot locked configuration and said back pivot locking mechanism is in said back pivot unlocked configuration; and
   b) a back-locked steering configuration whereat said front pivot locking mechanism is in said front pivot unlocked configuration and said back pivot locking mechanism is in said back pivot locked configuration; and
   a control mechanism comprising a front foot-operable pedal disposed adjacent said front portion of said cart and a back foot-operable pedal disposed adjacent said back portion of said cart, wherein said front cable portion and said back cable portion are movable by the control mechanism in opposite directions between said front-locked steering configuration and said back-locked steering configuration, said control mechanism being connected to the interconnection mechanism for selected movement of said interconnection mechanism between said front-locked steering configuration and said back-locked steering configuration.

2. The selectively operable steering locking mechanism of claim 1, wherein said front foot-operable pedal is operatively connected to said front cable portion and said back foot-operable pedal is operatively connected to said back cable portion to drive said movement of said front cable portion and said back cable portion in said opposite directions between said front-locked steering configuration and said back-locked steering configuration upon corresponding movement of said front and back foot-operable pedals.

3. The selectively operable steering locking mechanism of claim 1, further comprising a steering configuration retention mechanism for releasably holding said interconnecting mechanism in said front-locked steering configuration and for releasably holding said interconnecting mechanism in said back-locked steering configuration.

4. The selectively operable steering locking mechanism of claim 3, wherein said front cable portion and said back cable portion are movable by the control mechanism in opposite directions between said front-locked steering configuration and said back-locked steering configuration; and wherein said steering configuration retention mechanism comprises one or more front-locked notches located on said cart to correspond with said front-locked steering configuration, one or more back-locked notches located on said cart to correspond with said back-locked steering configuration, and one or more notch engagement mechanisms mounted on said front foot-operable pedal and said back foot-operable pedal for spring-biased releasable engagement with said one or more front-locked notches when said front cable portion is in said front-locked steering configuration and for spring-biased releasable engagement with said one or more back-locked notches when said back cable portion is in said back-locked steering configuration.

5. The selectively operable steering locking mechanism of claim 3, wherein an intermediate unlocked steering configuration resides between said front-locked steering configuration and said back-locked steering configuration, and in said intermediate unlocked steering configuration said front pivot locking mechanism is in said front pivot unlocked configuration and said back pivot locking mechanism is in said back pivot unlocked configuration; wherein said control mechanism selectively also moves said interconnection mechanism between said front-locked steering configuration, said intermediate unlocked steering configuration, and said back-locked steering configuration; and wherein said steering configuration retention mechanism also releasabiy holds said interconnecting mechanism in said intermediate unlocked steering configuration.

6. A selectively operable steering locking mechanism for a cart which is adapted for front and back travel and which has a front portion and a back portion opposite the front portion, one or more front casters disposed adjacent the front portion of the cart, one or more back casters disposed adjacent the back portion of the cart, and one or more additional casters, wherein each of said front casters, said back casters, and said additional casters is freely pivotable about a respective substantially vertical pivot axis, with said selectively operable steering locking mechanism comprising:
   a front pivot locking mechanism selectively movable between: a front pivot locked configuration whereat at least one of said front casters is precluded from pivoting about its said respective substantially vertical pivot axis; and a front pivot unlocked configuration whereat said at least one of said front casters is free to pivot about its said respective substantially vertical pivot axis;
   a back pivot locking mechanism selectively movable between: a back pivot locked configuration whereat at least one of said back casters is precluded from pivoting about its said respective substantially vertical pivot axis; and a back pivot unlocked configuration whereat said at least one of said back casters is free to pivot about its said respective substantially vertical pivot axis;

a non-electric interconnection mechanism mechanically connected to said front pivot locking mechanism and to said back pivot locking mechanism to drive synchronized movement, one with the other, between:

a) a front-locked steering configuration whereat said front pivot locking mechanism is in said front pivot locked configuration and said back pivot locking mechanism is in said back pivot unlocked configuration; and b) a back-locked steering configuration whereat said front pivot locking mechanism is in said front pivot unlocked configuration and said back pivot locking mechanism is in said back pivot locked configuration; and a non-electric control mechanism mechanically connected to the interconnection mechanism to drive selected movement of said interconnection mechanism between said front-locked steering configuration and said back-locked steering, configuration.

7. A selectively operable steering locking cart, adapted for front and back travel, comprising:

a front portion and a back portion opposite the front portion; a front left caster and a front right caster each disposed adjacent the front portion; and a back left caster and a back right caster each disposed adjacent the back portion; wherein each of said front left caster, said front right caster, said back left caster, and said back right caster is freely pivotable about a respective substantially vertical pivot axis;

a front pivot locking mechanism selectively movable between: a front pivot locked configuration whereat at least one of said front left caster and said front right caster is precluded from pivoting about its said respective substantially vertical pivot axis; and a front pivot unlocked configuration whereat said at least one of said front left caster and said front right caster is free to pivot about its said respective substantially vertical pivot axis;

a back pivot locking mechanism selectively movable between: a back pivot locked configuration whereat at least one of said back left caster and said back right caster is precluded from pivoting about its said respective substantially vertical pivot axis; and a back pivot unlocked configuration whereat said at least one of said back left caster and said back right caster is free to pivot about its said respective substantially vertical pivot axis;

a non-electric interconnection mechanism mechanically connected to said front pivot locking mechanism and to said back pivot locking mechanism to drive synchronized movement, one with the other, between:

a) a front-locked steering configuration whereat said front pivot locking mechanism is in said front pivot locked configuration and said back pivot locking mechanism is in said back pivot unlocked configuration; and b) a back-locked steering configuration whereat said front pivot locking mechanism is in said front pivot unlocked configuration and said back pivot locking mechanism is in said back pivot locked configuration; and a non-electric control mechanism mechanically connected to the interconnection mechanism to drive selected movement of said interconnection mechanism between said front-locked steering configuration and said back-locked steering configuration.

8. The selectively operable steering locking cart of claim 7, wherein said interconnection mechanism comprises a substantially rigid elongate rod member having a front rod portion disposed adjacent said front portion and a back rod portion disposed adjacent said back portion.

9. The selectively operable steering locking cart of claim 8, wherein said control mechanism comprises a front foot-operable pedal disposed adjacent said front portion and a back foot-operable pedal disposed adjacent said back portion.

10. The selectively operable steering locking cart of claim 9, wherein said elongate rod member defines a longitudinal axis and is movable by the control mechanism in opposite directions parallel to said longitudinal axis between said front-locked steering configuration and said back-locked steering configuration.

11. The selectively operable steering locking cart of claim 10, wherein said front foot-operable pedal is operatively connected to said front rod portion of said rod member and said back foot-operable pedal is operatively connected to said back rod portion of said rod member to drive said movement of said rod member in said opposite directions parallel to said longitudinal axis between said front-locked steering configuration and said back-locked steering configuration upon corresponding movement of said front and back foot-operable pedals.

12. The selectively operable steering locking cart of claim 7, wherein said interconnection mechanism comprises one or more Bowden cable members having a front cable portion disposed adjacent said front portion of said cart and a back cable portion disposed adjacent said back portion of said cart.

13. The selectively operable steering locking cart of claim 12, wherein said control mechanism comprises a front foot-operable pedal disposed adjacent said front portion of said cart and a back foot-operable pedal disposed adjacent said back portion of said cart, and wherein said front cable portion and said back cable portion are movable by the control mechanism in opposite directions between said front-locked steering configuration and said back-locked steering configuration.

14. The selectively operable steering locking cart of claim 13, wherein said front foot-operable pedal is operatively connected to said front cable portion and said back foot-operable pedal is operatively connected to said back cable portion to drive said movement of said front cable portion and said back cable portion in said opposite directions between said front-locked steering configuration and said back-locked steering configuration upon corresponding movement of said front and back foot-operable pedals.

15. The selectively operable steering locking mechanism of claim 7, wherein said interconnection mechanism comprises a belt member having a front belt portion disposed about a front pulley member adjacent said front portion of said cart, and a back belt portion disposed about a back pulley member adjacent said back portion of said cart.

16. The selectively operable steering locking mechanism of claim 15, wherein said control mechanism comprises a front foot-operable pedal disposed adjacent said front portion of said cart and a back foot-operable pedal disposed adjacent said back portion of said cart, and wherein said front pulley member and said back pulley member are rotatable with and by the belt member in opposite directions between said front-locked steering configuration and said back-locked steering configuration.

17. The selectively operable steering locking mechanism of claim 16, wherein said front foot-operable pedal is operatively connected to said front pulley member and said back foot-operable pedal is operatively connected to said back pulley member to drive said rotation of said front pulley member and said back pulley member with and by said belt member in said opposite directions between said front-locked steering configuration and said back-locked steering configuration upon corresponding movement of said front and back foot-operable pedals.

18. The selectively operable steering locking cart of claim 7, further comprising a steering configuration retention mechanism for releasably holding said interconnecting mechanism in said front-locked steering configuration and for releasably holding said interconnecting mechanism in said back-locked steering configuration.

19. The selectively operable steering locking cart of claim 18, wherein said steering configuration retention mechanism comprises one or more front-locked detents located on said rod member to correspond with said front-locked steering configuration, one or more back-locked detents located on said rod member to correspond with said back-locked steering configuration, and one or more detent engagement mechanisms mounted for spring-biased releasable radial engagement with said one or more front-locked detents when said rod member is in said front-locked steering configuration and for spring-biased releasable radial engagement with said one or more back-locked detents when said rod member is in said back-locked steering configuration.

20. The selectively operable steering locking cart of claim 19, wherein a single one of said front-locked detents is provided for each of said back-locked detents, and wherein a single one of said back-locked detents is provided for each of said front-locked detents.

21. The selectively operable steering locking cart of claim 19, wherein a first one of said detent engagement mechanisms is provided for said front-locked detents and a second one of said detent engagement mechanisms is provided for said back-locked detents.

22. The selectively operable steering locking cart of claim 18, wherein said interconnection mechanism comprises one or more flexible cable members having a front cable portion disposed adjacent said front portion of said cart and a back cable portion disposed adjacent said back portion of said cart; wherein said control mechanism comprises a front foot-operable pedal disposed adjacent said front portion of said cart and a back foot-operable pedal disposed adjacent said back portion of said cart; wherein said front cable portion and said back cable portion are movable by the control mechanism in opposite directions between said front-locked steering configuration and said back-locked steering configuration; and wherein said steering configuration retention mechanism comprises one or more front-locked notches located on said cart to correspond with said front-locked steering configuration, one or more back-locked notches located on said cart to correspond with said back-locked steering configuration, and one or more notch engagement mechanisms mounted on said front foot-operable pedal and said back foot-operable pedal for spring-biased releasable engagement with said one or more front-locked notches when said front cable portion is in said front-locked steering configuration and for spring-biased releasable engagement with said one or more back-locked notches when said back cable portion is in said back-locked steering configuration.

23. The selectively operable steering locking cart of claim 18, wherein said interconnection mechanism comprises a substantially rigid front rod member disposed adjacent said front portion of said cart and a substantially rigid back rod member disposed adjacent said back portion of said cart, and wherein said steering configuration retention mechanism comprises one or more front-locked detents located on said front rod member to correspond with said front-locked steering configuration, one or more back-locked detents located on said back rod member to correspond with said back-locked steering configuration, and two or more detent engagement mechanisms mounted on said cart for spring-biased releasable radial engagement with said one or more front-locked detents when said rod member is in said front-locked steering configuration and for spring-biased releasable radial engagement with said one or more back-locked detents when said rod member is in said back-locked steering configuration.

24. The selectively operable steering locking cart of claim 18, wherein an intermediate unlocked steering configuration resides between said front-locked steering configuration and said back-locked steering configuration, and in said intermediate unlocked steering configuration said front pivot locking mechanism is in said front pivot unlocked configuration and said back pivot locking mechanism is in said back pivot unlocked configuration; wherein said control mechanism selectively also moves said interconnection mechanism between said front-locked steering configuration, said intermediate unlocked steering configuration, and said back-locked steering configuration; and wherein said steering configuration retention mechanism also releasably holds said interconnecting mechanism in said intermediate unlocked steering configuration.

25. The selectively operable steering locking cart of claim 24, wherein said steering configuration retention mechanism further comprises one or more intermediate detents located on said rod member to correspond with said intermediate unlocked steering configuration, and one or more detent engagement mechanisms mounted for spring-biased releasable radial engagement with said one or more intermediate detents when said rod member is in said intermediate unlocked steering configuration.

26. The selectively operable steering locking cart of claim 7, wherein each of said front left caster, said front right caster, said back left caster, and said back right caster is freely rollable about a respective substantially horizontal roll axis; and further comprising a roll locking mechanism mounted on one or more of said front left caster, said front right caster, said back left caster, and said back right caster, wherein said roll locking mechanism is selectively movable between: a roll locked configuration whereat each of said one or more of said front left caster, said front right caster, said back left caster, and said back right caster is precluded from rolling about its said respective substantially horizontal roll axis; and a roll unlocked configuration whereat each of said one or more of said front left caster, said front right caster, said back left caster, and said back right caster is free to roll about its said respective substantially horizontal roll axis.

27. A selectively operable steering locking cart, adapted for front and back travel, comprising:
a front portion and a back portion opposite the front portion; one or more front casters disposed adjacent the front portion; one or more back casters disposed adjacent the back portion; and one or more additional casters; wherein each of said front casters, said back casters, and said additional casters is freely pivotable about a respective substantially vertical pivot axis;

a front pivot locking mechanism selectively movable between: a front pivot locked configuration whereat at least one of said front casters is precluded from pivoting about its said respective substantially vertical pivot axis; and a front pivot unlocked configuration whereat said at least one of said front casters is free to pivot about its said respective substantially vertical pivot axis;

a back pivot locking mechanism selectively movable between: a back pivot locked configuration whereat at least one of said back casters is precluded from pivoting about its said respective substantially vertical pivot axis; and a back pivot unlocked configuration whereat said at least one of said back casters is free to pivot about its said respective substantially vertical pivot axis;

a non-electric interconnection mechanism mechanically connected to said front pivot locking mechanism and to said back pivot locking mechanism to drive synchronized movement, one with the other, between:
 a) a front-locked steering configuration whereat said front pivot locking mechanism is in said front pivot locked configuration and said back pivot locking mechanism is in said back pivot unlocked configuration; and
 b) a back-locked steering configuration whereat said front pivot locking mechanism is in said front pivot unlocked configuration and said back pivot locking mechanism is in said back pivot locked configuration; and a non-electric control mechanism mechanically connected to the interconnection mechanism to drive selected movement of said interconnection mechanism between said front-locked steering configuration and said back-locked steering configuration.

28. The selectively operable steering locking cart according to claim 27 wherein at least one of said additional casters is disposed adjacent the front portion or the back portion.

* * * * *